United States Patent [19]

Takahashi et al.

[11] Patent Number: 5,363,166
[45] Date of Patent: Nov. 8, 1994

[54] PHOTOGRAPHIC FILM CASSETTE AND CAMERA FOR USE THEREIN

[75] Inventors: Koichi Takahashi; Kiichiro Kitagawa, both of Kanagawa, Japan

[73] Assignee: Fuji Photo Film Co., Ltd., Kanagawa, Japan

[21] Appl. No.: 986,621

[22] Filed: Dec. 7, 1992

[30] Foreign Application Priority Data

Dec. 6, 1991 [JP] Japan ............... 3-323059
Jul. 15, 1992 [JP] Japan ............... 4-188340

[51] Int. Cl.$^5$ .............................. G03B 17/26
[52] U.S. Cl. .................... 354/275; 354/288; 242/348.3; 242/348.4
[58] Field of Search .............. 354/87, 212, 213, 214, 354/215, 275, 288; 242/71, 71.1, 71.2

[56] References Cited

U.S. PATENT DOCUMENTS

| | | | |
|---|---|---|---|
| 4,167,318 | 9/1979 | Wareham | 354/87 X |
| 4,516,843 | 5/1985 | Ohmura | 354/212 X |
| 4,641,936 | 2/1987 | Harvey et al. | 354/212 |
| 4,832,275 | 5/1989 | Robertson | 354/275 X |
| 4,834,306 | 5/1989 | Robertson et al. | 354/275 X |

FOREIGN PATENT DOCUMENTS

| | | |
|---|---|---|
| 0091077 | 10/1983 | European Pat. Off. |
| 0453864 | 10/1991 | European Pat. Off. |
| 0485957 | 5/1992 | European Pat. Off. |
| 3907539 | 9/1989 | Germany |

*Primary Examiner*—Howard B. Blankenship
*Attorney, Agent, or Firm*—Sughrue, Mion, Zinn, Macpeak & Seas

[57] ABSTRACT

A photographic film cassette has photographic film wound on a spool and contained in a cassette shell. Rotation of the spool in the unwinding direction causes a leader to advance through a passageway and exit from a passage mouth. The passageway is defined by a pair of opposed inside faces. The first inside face confronts the emulsion surface of the photographic film, and the second inside face confronts its back surface. A separator claw is formed adjacent to the first inside face, and separates the leader from the roll. The separator claw is formed to project only to a small degree so that the photographic film is prevented from being rubbed and scratched thereby, even when the diameter of the roll is minimized. In a preferred embodiment, a camera for use with such a leader-advancing cassette has a receiving port, which is open to the inside of a cassette receiving chamber, and receives the photographic film as exited from the cassette. A front wall of the receiving port is formed so as to prevent the photographic film from being rubbed and scratched by the first inside face of the cassette.

36 Claims, 16 Drawing Sheets

PHOTOGRAPHIC FILM CASSETTE AND CAMERA FOR USE THEREIN

BACKGROUND OF THE INVENTION

1. Field of the Invention

The present invention relates to a photographic film cassette and a camera for use therewith. More particularly, the present invention relates to an improvement of a photographic film cassette in which a leader of a photographic film can be advanced to the outside of a cassette shell when a spool is rotated in an unwinding direction, and a camera suitable for use with the novel cassette.

2. Description of the Related Art

A known photographic film cassette includes a photographic film positioned so that a leader does not protrude from the cassette shell prior to loading the cassette in a camera. Such a cassette is easily loaded into a camera. A simple photographic film-transporting mechanism of the camera is typically used with this type of cassette, and includes a construction which rotates a spool to unwind a photographic film strip (hereinafter called as film), thereby causing the leader to move through a passageway for the photographic film and exit from the cassette, as suggested in U.S. Pat. Nos. 4,834,306 and 4,832,275.

To advance the leader outward by rotating the spool, the cassette requires a structure for transmitting rotation of the spool to a roll of the photographic film. It is known to provide the inside of the cassette shell with arcuate ridges to be in contact with the roll so as to prevent the roll from loosening and thus transmit rotation of the speed to the film. The photographic film presses itself against the arcuate ridges, due to its tendency to recover a straight form. To cause the leader to exit through a passage mouth of the cassette shell, it is known to utilize a separator claw arranged inside the cassette shell so as to abut upon the leader. During rotation of the roll, the leader abuts upon the separator claw, which separates the leader from the roll so as to direct the leader toward the passage mouth, until the leader exits from the cassette to be received by the camera.

To prevent ambient light from entering the cassette shell, light-trapping ribbons having pile threads are conventionally attached to the inside of the passageway. It is also disclosed in Japanese Patent Laid-open Publication No. 3-37645 (corresponding to U.S. patent application Ser. No. 07/870,212 and EP 0 406 815 A2) that a moveable cover member may be positioned over the passage mouth so as to prevent light from entering the cassette shell. The cover member is released from a locking mechanism and opened by a camera, when the camera is loaded with the cassette, e.g. in response to closing a door of a cassette receiving chamber. When the cover member is open, the advancing mechanism incorporated in the camera rotates the spool in the unwinding direction so as to advance the leader out of the cassette. The cover member is closed when the photographic film is wound back into the cassette shell after the exposure of the photographic film is completed. The closed cover member is then locked, e.g. in response to opening of the chamber door. The closed cover member serves to protect the exposed photographic film inside from being subjected to ambient light inadvertently.

There is, however, a problem in the above cassettes in that the emulsion surface of the photographic film is sometimes scratched or damaged. In particular, during transportation of the photographic film for advancement or rewinding, the photographic film comes in direct sliding contact with relevant portions of the plastic cassette shell, such as the separator claw and edges of the passage mouth. Although the light-trapping ribbon can come into contact with the photographic film without damaging it, the photographic film may become damaged due to frictional contact with the separator claw and/or the wall inside the passageway. Also, in such a case, dust is created from both the emulsion surface and the back surface of the photographic film, and the dust may adhere on the image frames on the photographic film. This can hinder the development process.

SUMMARY OF THE INVENTION

In view of the foregoing problems, an object of the present invention is to provide a leader-advancing photographic film cassette in which the surfaces of the photographic film are protected from damage, and a camera for use with the cassette.

In order to achieve the above and other objects and advantages of this invention, a passageway is formed in the cassette shell to provide communication between the roll chamber and the passage mouth for passing the photographic film. The passageway is defined by opposed first and second inside faces which are spaced apart from each other. The first inside face is in opposition to the emulsion surface of the photographic film, and the second inside face is in opposition to the back surface of the photographic film when the film is passing through the passageway. A separator claw is formed on the first inside face on a side of the roll chamber for separating the leader from the roll wound around the spool. The first inside face and the separator claw do not intersect a tangent line which passes through an edge of the second inside face, on a side thereof proximate the passage mouth, and is tangent to the spool core.

In a preferred embodiment, a camera for use with such a leader-advancing photographic film cassette has a cassette receiving chamber for loading the photographic film cassette therein. A receiving port is formed in communication with the cassette receiving chamber for receiving the photographic film as it is advanced from the passage mouth while the photographic film cassette is loaded. The receiving port has front and back walls. The front wall of the receiving port is formed so that a straight line commonly tangent to the front wall and the spool core of the photographic film cassette inside the cassette receiving chamber does not intersect the first inside face of the photographic film cassette.

Because the photographic film of the leader-advancing photographic film cassette is prevented from coming in contact with relevant portions of both the cassette and the camera, the surfaces of the photographic film are not damaged.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

Figure 1:
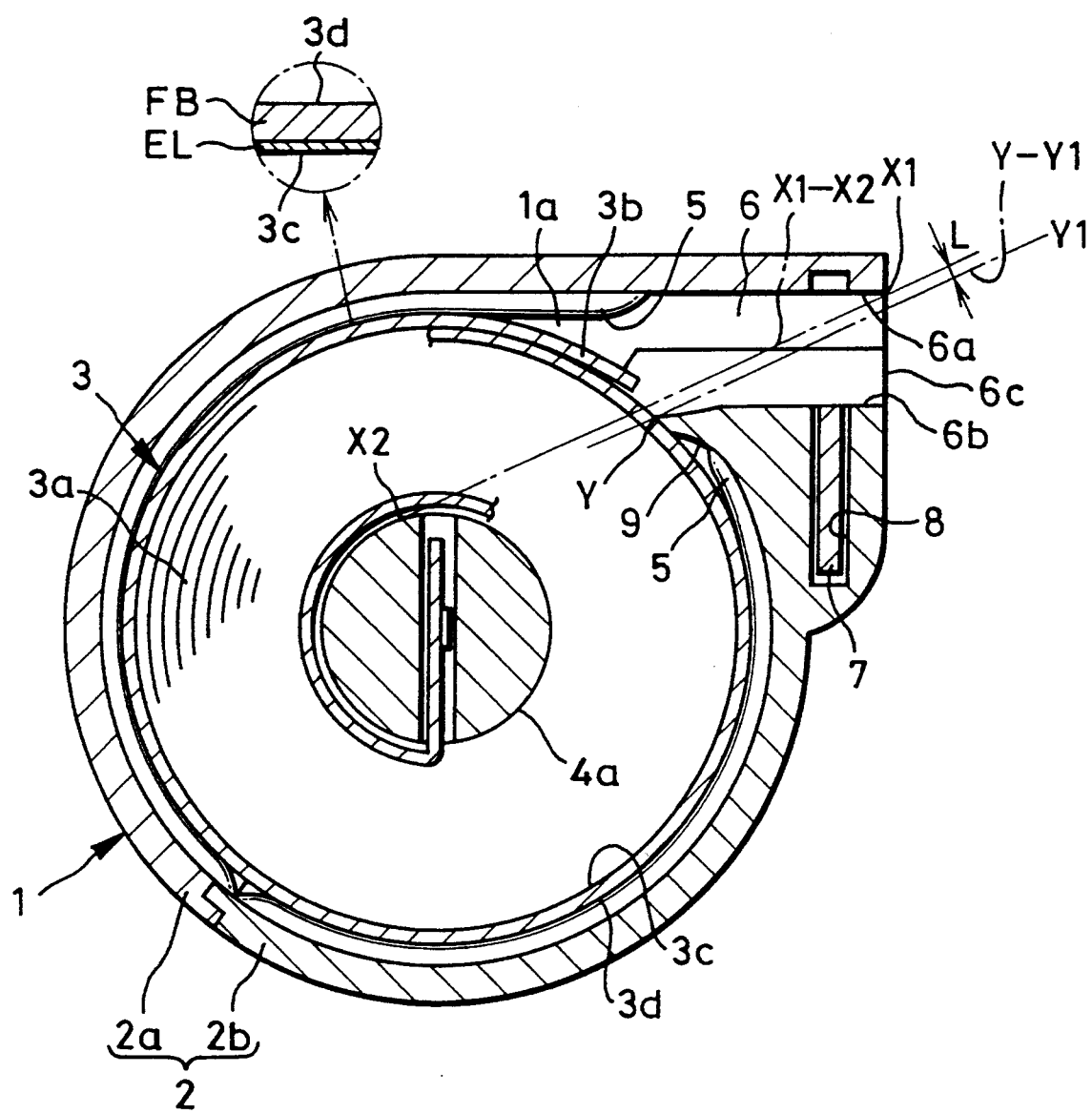
FIG. 1 is a cross sectional view illustrating a photographic film cassette of the first preferred embodiment.
Figure 2:
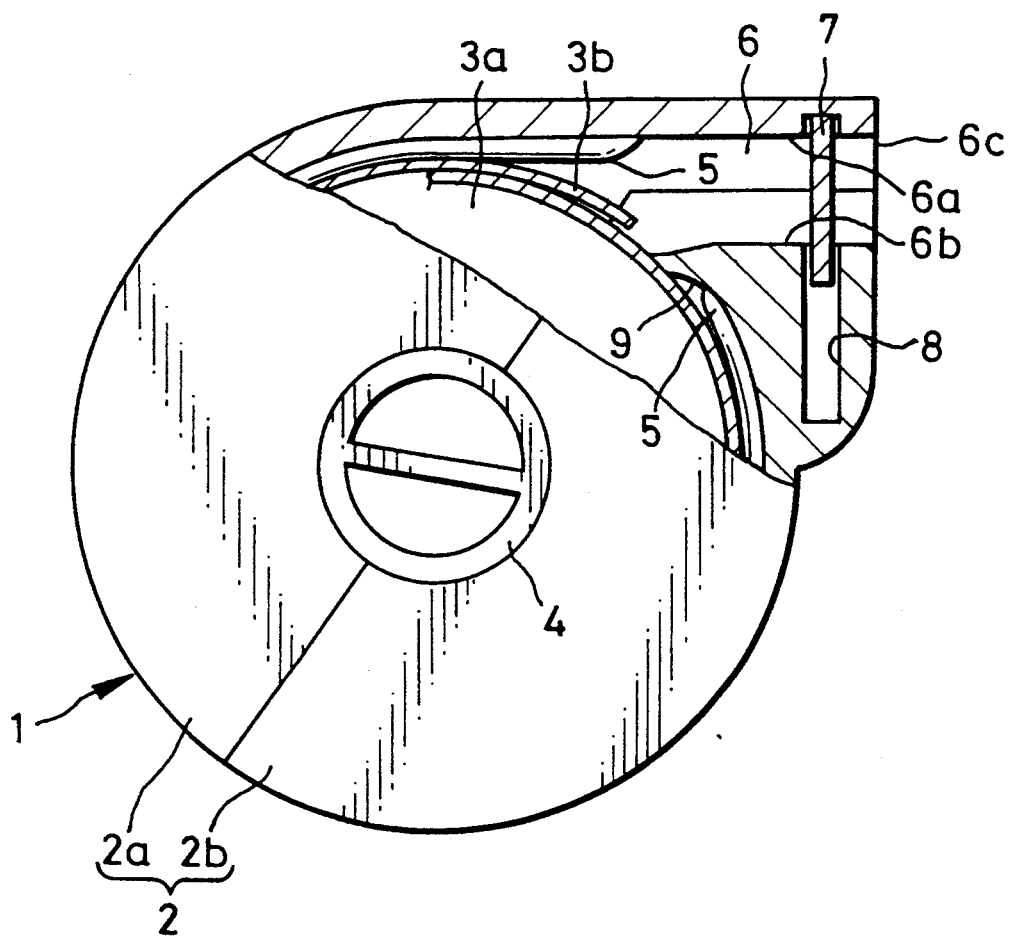
FIG. 2 is an end view, in partial section, illustrating the cassette in the state where a slidable shutter plate is closed.
Figure 3:
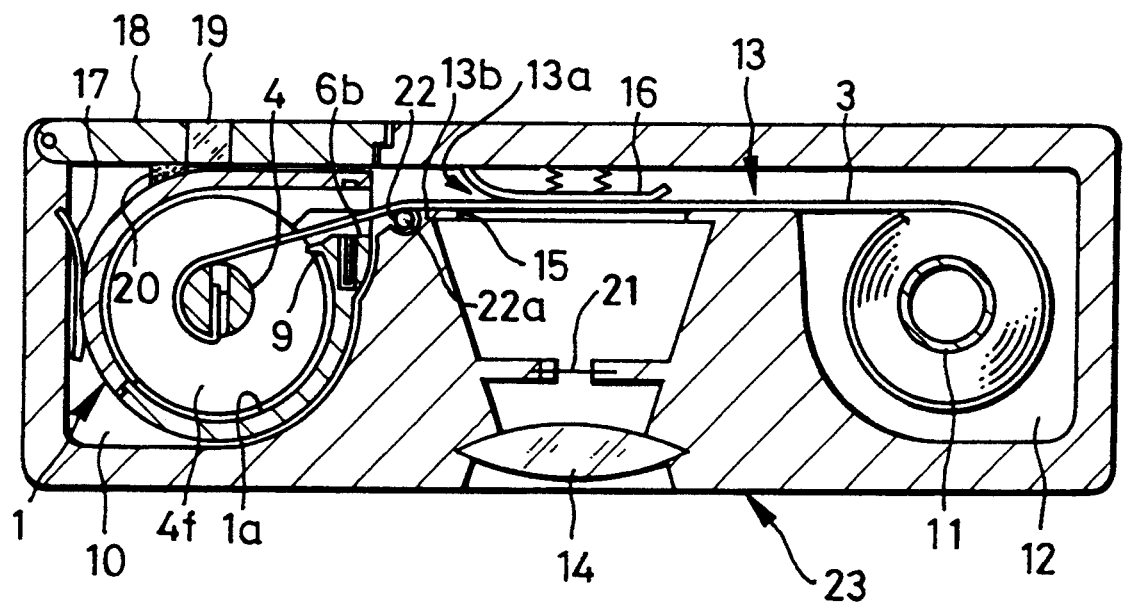
FIG. 3 is a horizontal sectional view illustrating a camera loaded with the cassette of FIGS. 1 and 2.
Figure 4:
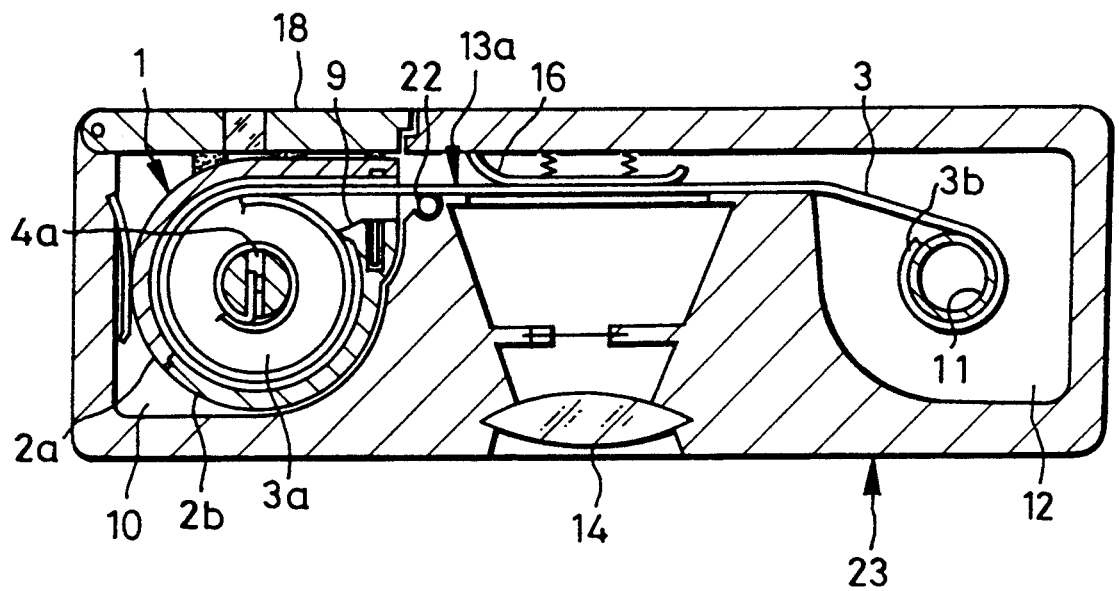
FIG. 4 is a horizontal sectional view illustrating the camera in which the photographic film is being transported.
Figure 5:
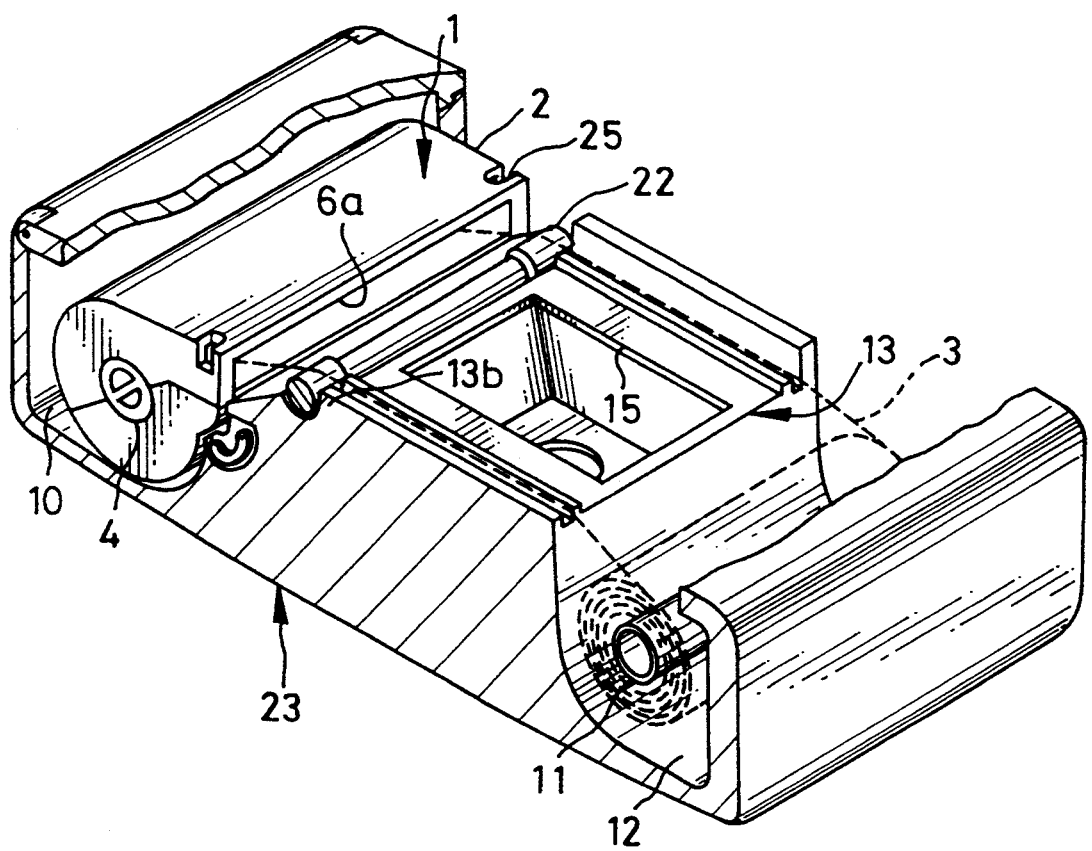
FIG. 5 is a perspective view, in partial section, illustrating the inside of the camera.

In FIGS. 1 and 2 illustrating a photographic film cassette 1, a cassette shell 2 is constituted of first and second shell halves 2a and 2b respectively molded from plastics. A spool 4 is rotatably contained in the cassette shell 2. Photographic film 3 is wound in a roll 3a on the spool 4 between a pair of flanges 4f formed on the spool (see FIG. 3). The photographic film 3 is constituted of a photographic film base material FB and an photosensitive emulsion layer EL layered on the base material FB, so as to have two surfaces, an emulsion surface 3c and a back surface 3d. The inside of the two shell halves is provided with two pairs of arcuate ridges 5 formed integrally therewith, so as to be in contact with the outermost turn of the roll 3a of the photographic film 3 and prevent the roll 3a from loosening. A passageway 6 for the photographic film 3 provides communication between a passage mouth 6c and a roll chamber 1a of the cassette 1. Passageway 6 is defined between first and second inside faces 6a and 6b formed in the cassette shell 2.

A slot 8 is formed in the first inside face 6b. The slot 8 is adapted to containing a shutter plate 7, which is arranged to be slidable out of the slot 8. A separator claw 9 is formed on the first inside face 6b on the side of the roll chamber 1a, and is used to separate a leader 3b of the photographic film 3 from the inner roll 3a by virtue of abutment upon the outermost turn of the roll 3a. Let X1 be a point on the outermost edge of the second inside face 6a. A tangent line is defined from point X1 to a circumference of a core 4a of the spool 4, as line X1–X2 which is tangential to the spool core 4a. Let Y be a point on either the separator claw 9 or the first inside face 6b, and Y–Y1 be a line passing through point Y and parallel to line X1–X2. It should be noted that point Y must be a point where line Y–Y1 is tangent to the either the separator claw 9 or the first inside face 6b of the first shell half 2b. Let L be a distance between lines X1–X2 and Y–Y1. The cassette shell 2 of the novel cassette 1 meets the condition:

$$L>0$$

When this condition is satisfied the film 3 is prevented from being scratched by the separator claw 9.

FIGS. 3 to 6 illustrates a camera 23 for use with the above-described cassette 1. The camera 23 has a cassette receiving chamber 10 for receiving the cassette 1 when it is loaded in the camera, and a take-up chamber 12 in which the photographic film 3 is wound after exposure. The take-up chamber 12 is provided with a take-up spool 11 on which the photographic film 3 is wound in a roll after each exposure. A passageway 13 for the photographic film 3 extends between the chambers 10 and 12. Along the passageway 13 is arranged an exposure aperture 15. A pressure plate 16 is disposed in opposition to the exposure aperture 15 to press the photographic film 3 toward the exposure aperture 15.

A spring plate 17 is disposed in the cassette receiving chamber 10 to hold the cassette shell 2 inside the chamber 10 in proper position. A transparent window 19 is provided in a back door 18 of the camera 23 for visual inspection of an indication printed on the surface of the cassette shell 2, while the cassette 1 is loaded within the camera 23. The indication may represent ISO sensitivity of the photographic film 3, for example. A light-shielding resinous member 20 is attached to the inside of the back door 18 around the window 19 (see FIG. 6). Reference numeral 21 designates a shutter leaf of the camera 23.

The passageway 13 of the camera 23 has a photographic film receiving port 13a, which is defined by a front wall 13b and the pressure plate 16. The port front wall 13b incorporates a roller 22 which is rotatable around a shaft. The axis of roller 22 extends transverse to the direction of advancement of the photographic film 3. As seen from FIG. 5, the diameter of the midway portion of the roller 22 is smaller than that of its top and bottom ends so that the emulsion surface 3c of the photographic film 3 is brought into contact with only the top and bottom ends of the roller 22. Accordingly, the roller does not come into contact with image frames.

Figure 6:
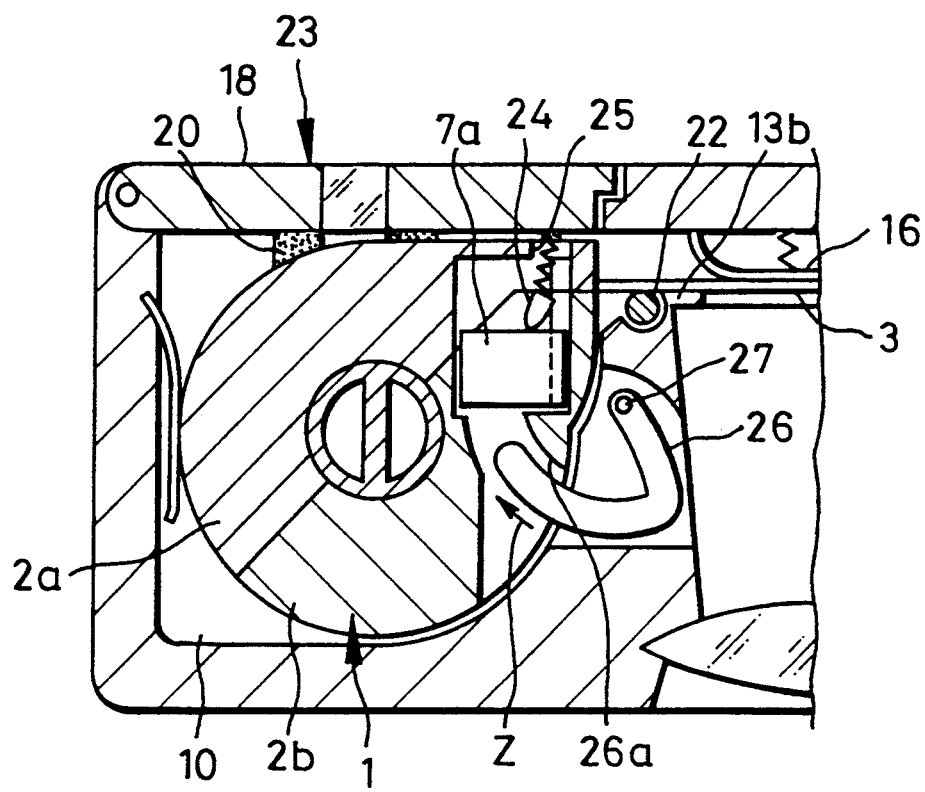
FIG. 6 is a sectional view illustrating a mechanism of the camera relevant to the shutter plate of the cassette.

The back door 18 is provided with a pair of opening claws 24, which are connected to the back door 18 via springs (see FIG. 6). A pair of access holes 25 are formed in the second shell half 2a. When the back door 18 is closed, the opening claws 24 are responsively inserted into the access holes 25 by virtue of the biasing force of the springs. The shutter plate 7 of the cassette 1 has a pair of projected leg portions 7a, which are respectively pressed by the opening claws 24 and slid down to move the shutter plate 7, which generally has a channel shape, to an open position. In the camera 23 are arranged a pair of hook-shaped arms 26 swingably mounted around a shaft 27, for moving the shutter plate 7 to a closed position. When the photographic film 3 is completely rewound into the cassette shell 2 after all exposures, a relevant mechanism of the camera 23, such as a stepper motor, is responsively commanded, by a controller, to rotate the closing arms 26, in a clockwise direction, to enter a pair of access openings 26a, which are formed in the first shell half 2b. The closing arms 26 come into contact with the leg portions 7a against the spring force on the operating claws 24 so as to slide the shutter plate 7 to the initial closed position for shielding ambient light. Note that it is well known to utilize a controller, such as a microprocessor based device to control the sequential operations of a camera. Also, these operations can be accomplished manually with conventional linkages.

Due to this construction, when the photographic film 3 is entirely wound within the cassette shell 2, the emulsion surface 3c of the photographic film 3 is prevented from coming into contact with the separator claw 9 and the first inside face 6b of the first shell half 2b. Even when the entire photographic film 3 is drawn out of the cassette shell 2, the emulsion surface 3c is kept from contact with the separator claw 9 and the first inside face 6b, because of the roller 22 arranged close to the passage mouth 6c and in the appropriate position with respect to the spool 4 (see FIG. 3). The photographic film 3 is prevented from coming into contact with the separator claw 9 or the first inside face 6b, during advancement for taking photographs or rewinding after completing exposures due to the above-described construction of the cassette. Note that the ridges 5 formed in the cassette 1 are omitted from FIG. 3 for convenience in understanding.

The operation of the photographic film cassette 1 and the camera 23 will now be described. When the back door 18 of the camera 23 is open, the cassette 1 is inserted. The back door 18 is closed so as to insert the opening claws 24 into the holes 25, and depress the leg portions 7a, until the shutter plate 7 is slid toward the front of the camera 23 to the open position wherein the passageway 6 is open. In response to closing the back door 18, a drive shaft (see drive shaft 63 in FIG. 13) in the camera 23 is caused to rotate in the direction of advancing the photographic film 3 by a motor (not illustrated). As engaged with the drive shaft, the spool 4 rotates too. The outermost turn of the roll 3a is prevented from loosening by the ridges 5, and therefore is rotated together with the spool 4.

When the leader 3b of the photographic film 3 rotates to the separator claw 9, it abuts thereon, is separated from the roll 3a and is directed through the passageway 6 toward the passage mouth 6c. When the leader 3b exits from the passage mouth 6c and enters the receiving port 13a and then the passageway 13, the photographic film 3 is advanced into the camera 23 by an incorporated feeding mechanism without contact between the emulsion surface 3c with the cassette shell 2. The frames on the emulsion surface 3c to be photographed are also prevented from contact with the camera 23 at the receiving port 13a due to the roller 22 disposed in the port front wall 13b. Accordingly, the photographic film 3 is not damaged.

When most of the photographic film 3 has been exposed, thus minimizing the diameter of the roll 3a, the photographic film 3 is stretched between the spool core 4a and the roller 22. The emulsion surface 3c is still prevented from contacting the separator claw 9 and the first inside face 6b, and protected from suffering damages during advancement for exposure because the relationship $L > 0$ is satisfied. Also, in rewinding the photographic film 3, the emulsion surface 3c does not come into contact with the separator claw 9 or the first inside face 6b. Note that looseness of the photographic film 3 may develop between the spool 4 and the take-up spool 11. However, the photographic film 3 is protected from damage because of the space defined between the first inside face 6b and the second inside face 6a into which the photographic film 3 can be stored in flexure.

When the entire photographic film 3, as exposed, is rewound into the cassette shell 2, the closing arms 26 are swung in the clockwise direction 'Z by a motor (not illustrated), to press the leg portions 7a to slide the shutter plate 7 of the cassette 1 to the position for closing the passageway 6 (see FIG. 6). The shutter plate 7 is provided with tiny latching structures each consisting of a clicking projection with a corresponding recess for retaining the shutter plate 7 in the closed and open positions respectively, and thus is maintained in the desired position even when subjected to shock. A photographer opens the back door 18 and unloads the cassette 1, to forward it to a photofinisher.

Figure 7:
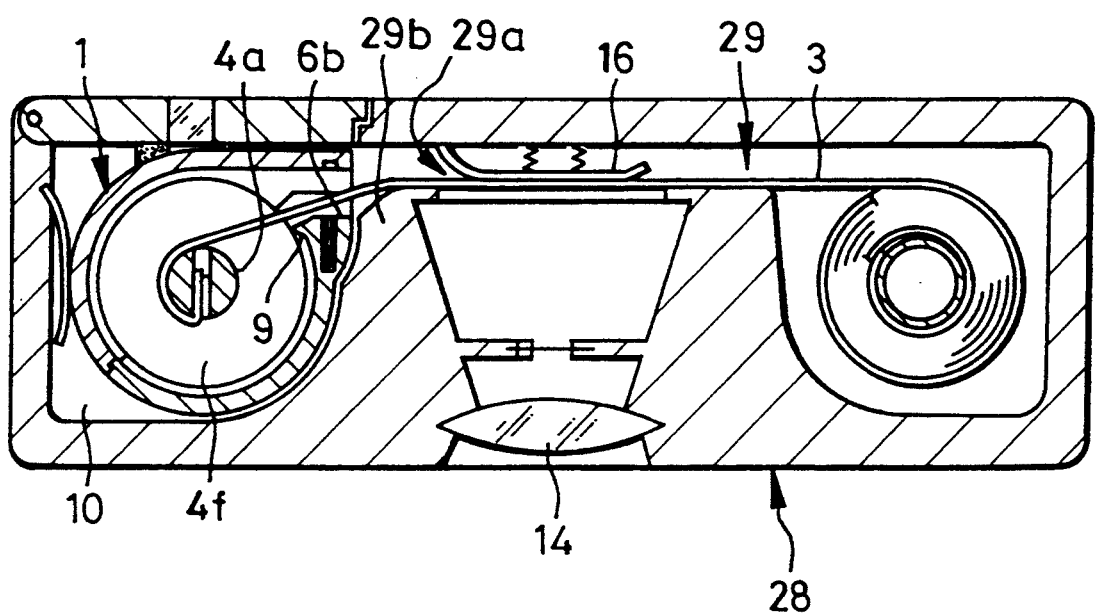
FIG. 7 is a horizontal section illustrating another preferred embodiment of a camera for use with the same cassette.

FIG. 7 illustrates a passageway 29 of another preferred camera 28, which lacks the roller 22 but has a rounded port front wall 29b at a receiving port 29a. In such a camera the emulsion surface 3c is prevented from contacting the separator claw 9 and the first inside face 6b during initial advancement of the photographic film 3 into the camera 28, as well as when the diameter of roll 3a of the photographic film 3 is minimized to stretch the film 3 between the spool core 4a and the rounded port front wall 29b. The frames to be photographed are prevented from coming into contact with the camera 28 at the receiving port 29a, due to the rounded port front wall 29b, both during advancement for exposure and in rewinding the photographic film 3. Accordingly, no damage to the photographic film 3 occurs. The rounded port front wall 29b is arranged so as to extend across the direction of advancement of the photographic film 3. The level of the midway portion of the rounded port front wall 29b is recessed from that of its top and bottom ends so that an emulsion surface 3c of the photographic film 3 is brought into contact only with the top and bottom ends of the rounded port front wall 29b.

Note that it would be possible to arrange an additional roller in a port of the passageway 13 on the side of the take-up chamber 12 to be constructed in a similar manner to the roller 22. It is preferable to construct the roller 22 from a resinous material which is highly resilient and durable, in consideration of the direct contact between the roller 22 and edges of the photographic film 3.

Figure 8:
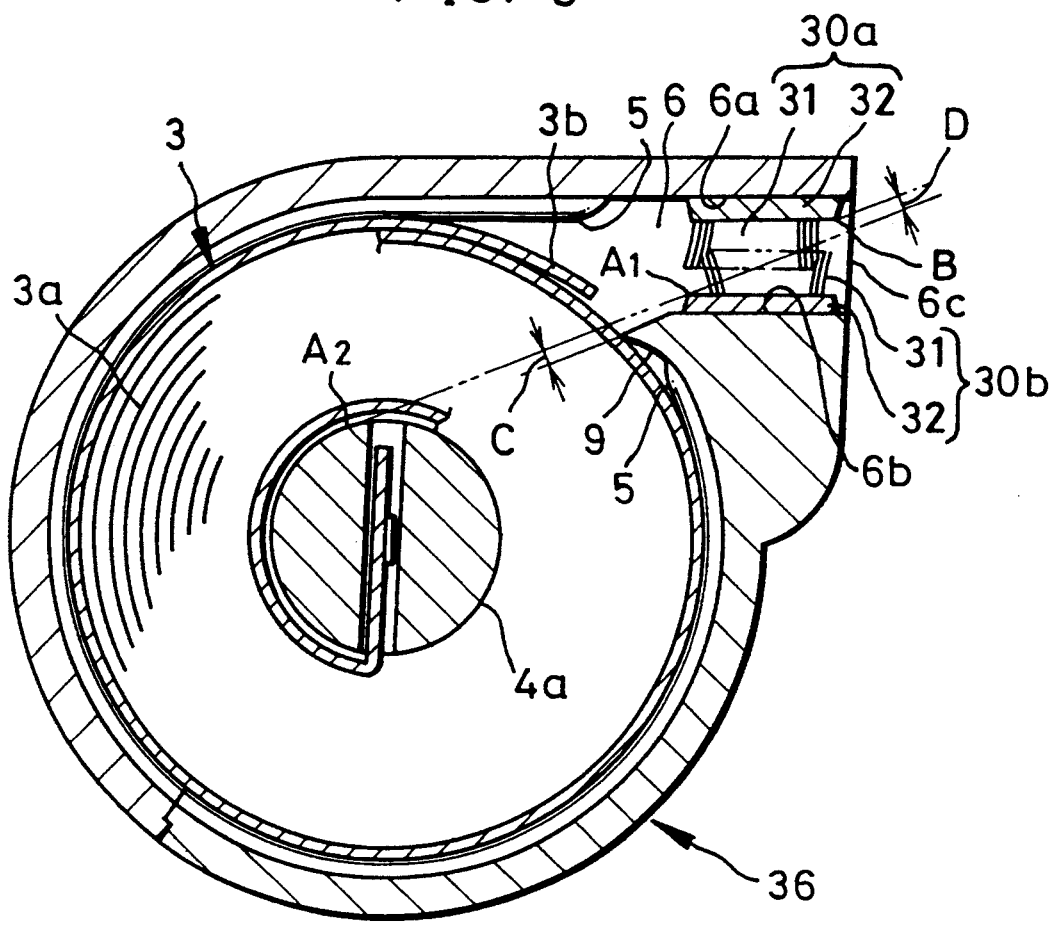
FIG. 8 is a cross section illustrating another preferred embodiment of a cassette in which light-trapping ribbons are used.
Figure 9:
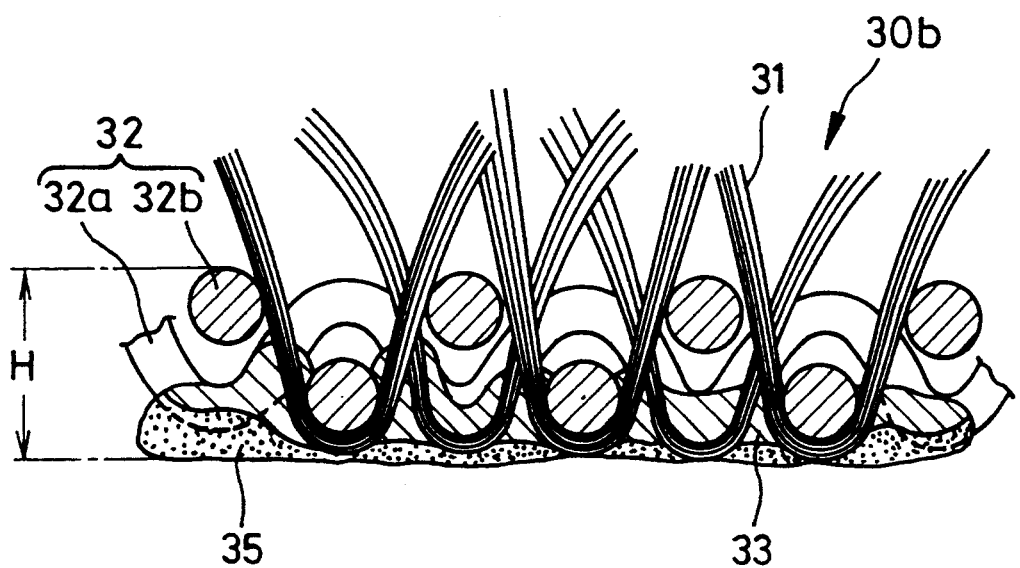
FIG. 9 is an explanatory view illustrating a structure of the light-trapping ribbons.

FIG. 8 illustrates another preferred embodiment in which light-trapping ribbons (known as "plush" in the field of photography) 30a and 30b are used. As illustrated in FIG. 9, the light-trapping ribbons 30a and 30b respectively consist of ground or base fabric 32, woven from warp threads 32a and weft threads 32b, and pile threads 31 produced from resilient resinous material and woven into the base fabric 32. Even when in contact with the pile threads 31, the emulsion surface 3c of the photographic film 3 will not be damaged because of the resilience of the pile threads 31. Each ribbon 30a, 30b is subjected to the sealing process where sealing resin 33 is applied to its bottom surface, and is attached with an adhesive agent 35 to the inside face 6a, 6b.

Let H be the thickness of the base fabric 32. A straight line A1–A2 is commonly tangent to an inner top edge A1 of the base fabric 32 of the first ribbon 30b and to the spool core 4a, where A2 is a point where the line is tangent to the spool core 4a.

A surface of the separator claw 9 of a photographic film cassette 36 of this embodiment is spaced apart from line A1–A2 at a clearance C>0 as illustrated in FIG. 8. The photographic film 3, therefore, never crosses over line A1–A2 to the side of line A1–A2 on which the separator claw 9 is disposed, no matter how small the roll 3a of the photographic film 3 becomes while the photographic film 3 is advanced outward of the cassette shell 2. Thus the emulsion surface 3c does not come into contact with the separator claw 9 or the first inside face 9b, and is therefore protected from damage. It is preferable to set a predetermined clearance D between line A1–A2 and point B on an outer top edge of the base fabric 32 of the second ribbon 30a. Letting B represent the point on the base fabric 32 closest to the line A1–A2. The back surface 3d of the photographic film 3 is therefore rubbed only by the pile threads 31, and is thus maintained free from damage.

Figure 10:
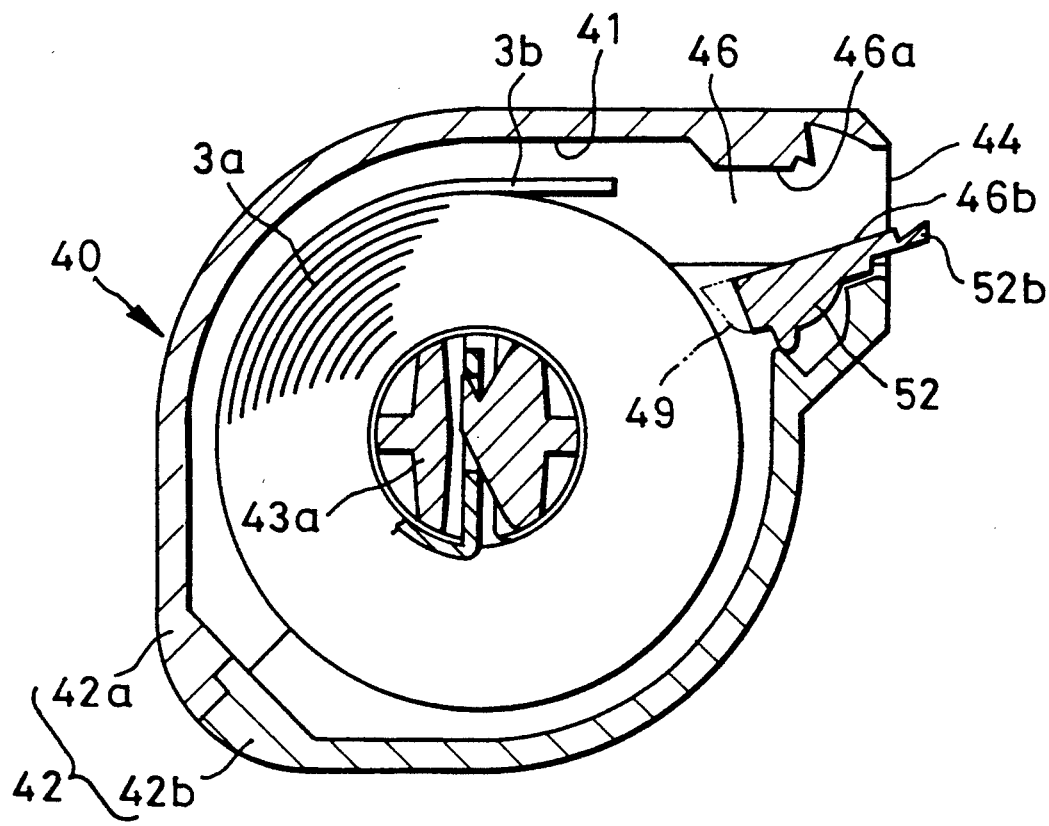
FIG. 10 is a cross section illustrating a cassette in which a swingable shutter plate is used.
Figure 11:
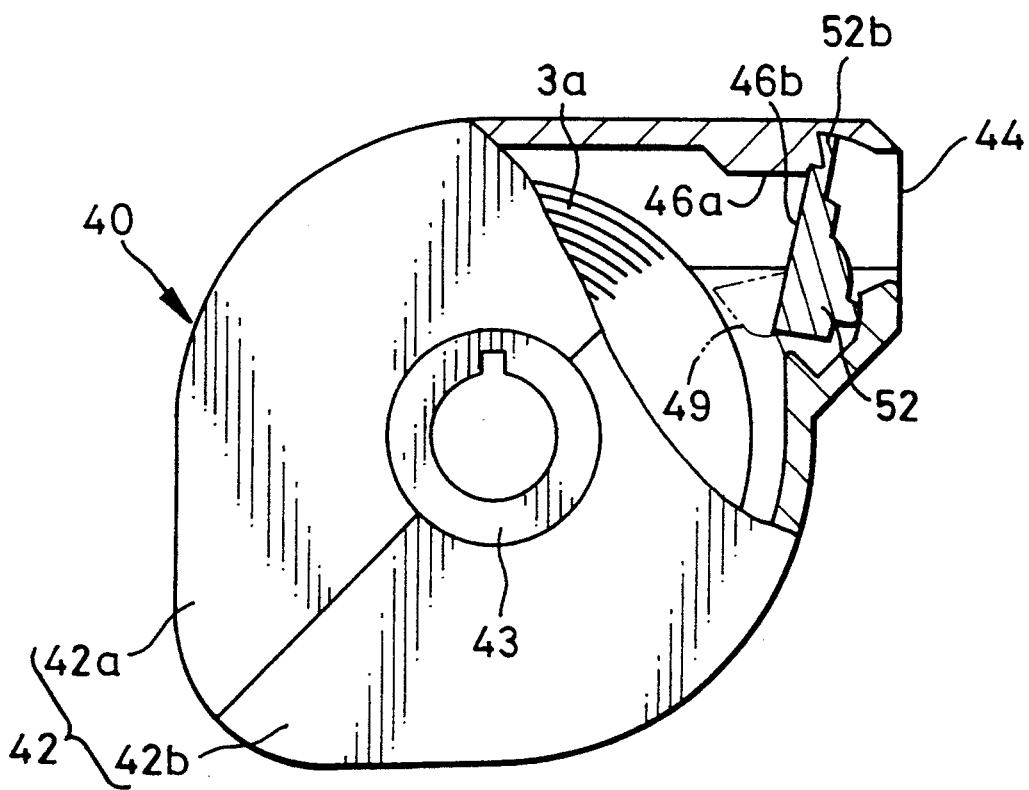
FIG. 11 is a cross section illustrating the cassette of FIG. 10 in the state where the shutter plate is closed.
Figure 12:
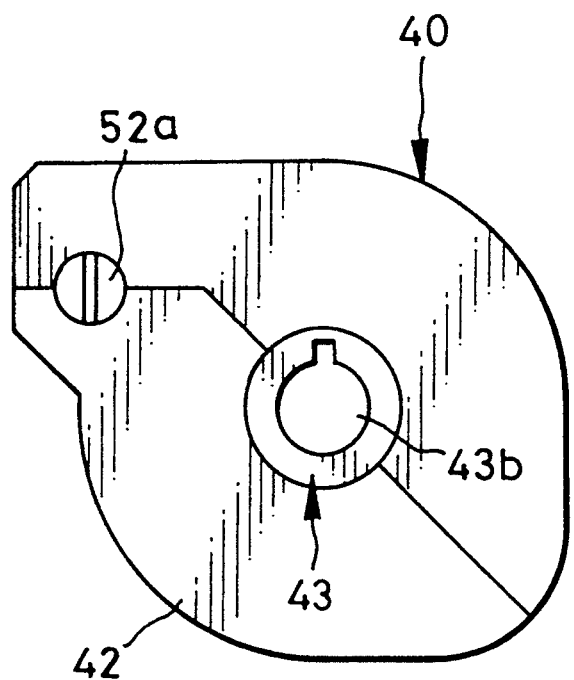
FIG. 12 is an end view illustrating the cassette.

FIGS. 10 to 12 illustrate a photographic film cassette 40 of another embodiment, in which the emulsion surface 3c and the back surface 3d of the entire photographic film 3 can be prevented from coming into contact with, and thus protected from damage by, either inside face of a passageway, when the photographic film is advanced out of the cassette 40. Elements the same as the above embodiments are designated with the identical reference numerals. A cassette shell 42 consists of shell halves 42a and 42b each molded from plastics. The photographic film 3 is wound on a core 43a of a spool 43. A passageway 46 is defined between inside faces 46a and 46b of the cassette shell 40, and opens to the exterior thereof via a passage mouth 44. A separator claw 49, and other relevant structure is provided for advancing the leader 3b of the photographic film 3 outward from the passage mouth 44 in response to rotation of the spool 43. Note that the ridges 5 provided inside the cassette 40 are omitted from FIGS. 10 and 11 for simplicity.

In the photographic film cassette 40, a shutter plate 52 defines the first inside face 46b, and is rotatably supported on a portion of the first shell half 42b. The shutter plate 52 is supported so as to be swingable from a closed position to an open position. The shutter plate 52, when in the closed position, comes in contact with the second inside face 46a, and partitions a roll chamber 41 from the passage mouth 44 so as to close the passageway 46. When in the open position, the shutter plate 52 retreats toward the first shell half 42b, and allows communication between the passage mouth 44 and the roll chamber 41 so as to allow film to advance through the passageway 46. Bearing holes are formed in end faces of the cassette shell 42 for rotatably supporting both distal ends of the shutter plate 52. A shaft portion 52a of one distal end of the shutter plate 52 extends to the exterior of the cassette shell 42 through one of the bearing holes so that the shaft portion 52a is operable externally (see FIG. 12). An end 43b of the spool core 43a, which extends through the cassette shell 42, is on the same side as the shaft portion 52a.

Figure 13:
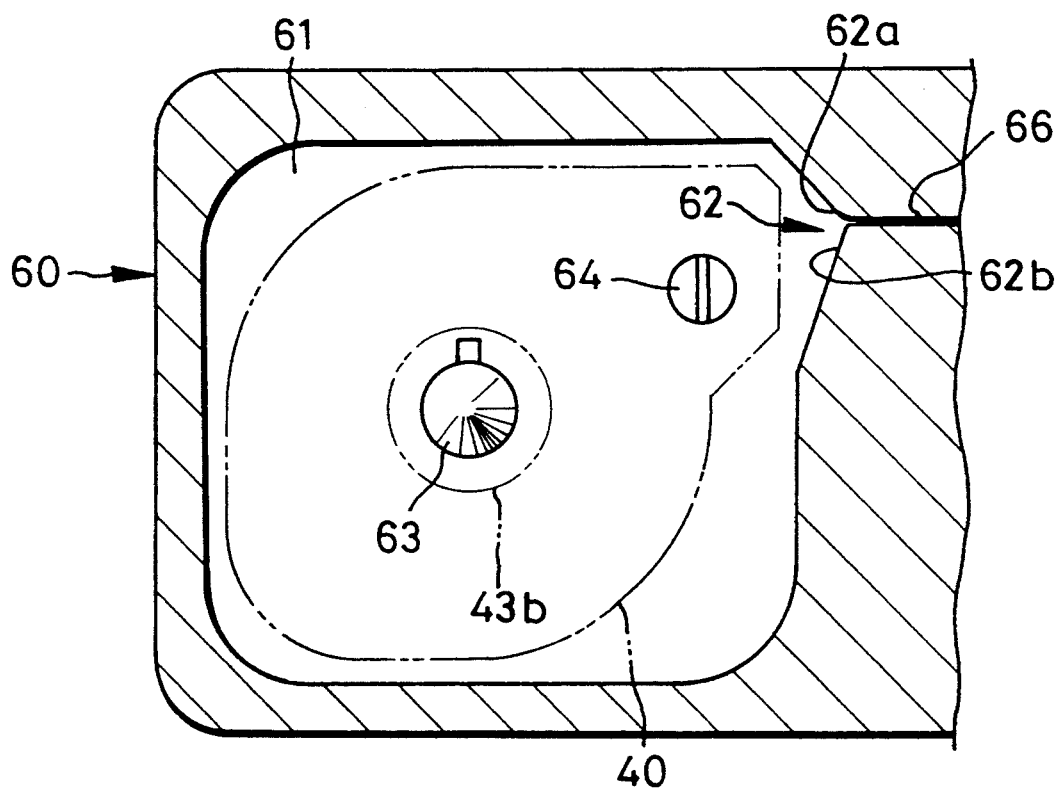
FIG. 13 is a horizontal sectional view, illustrating a novel camera for use with the cassette of FIGS. 10 to 12.

FIG. 13 illustrates a camera 60 for use with the cassette 40. The cassette 40 is inserted in a cassette receiving chamber 61 defined in the camera 60. A photographic film receiving port 62 at the end of a passageway 66 is defined by a back wall 62a and a front wall 62b. The end 43b of the spool core 43a has a recess which is engaged with a drive shaft 63 of the camera 60. The shaft portion 52a of the shutter plate 52 has a recess formed therein which is engaged with an opening shaft 64 of the camera 60. The cassette 40 is properly positioned within the receiving chamber 61 by the engagement of the drive shaft 63 and the opening shaft 64. The cassette 40 thus positioned in the receiving chamber 61 has rotational tolerance at a range of +/−1° around the axis of the drive shaft 63.

Figure 14:
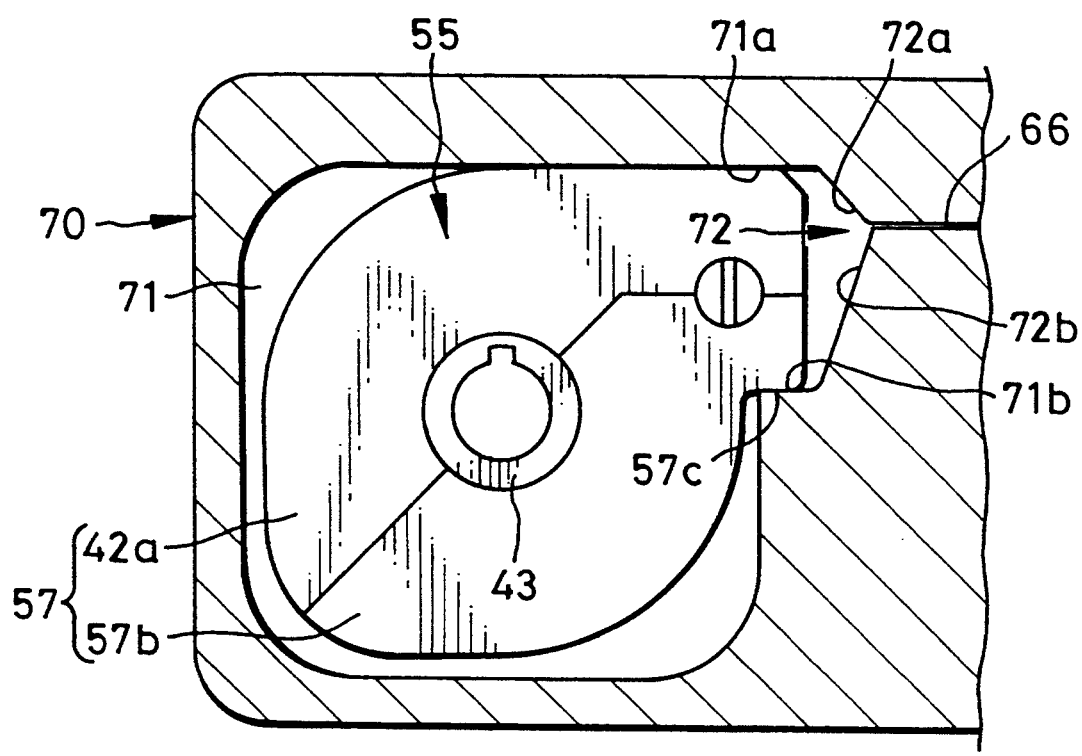
FIG. 14 is a horizontal sectional view, illustrating another embodiment of a camera containing another embodiment of the cassette.

A cassette 55 according to another embodiment, having the swingable shutter plate 52, can be constructed as illustrated in FIG. 14. Elements similar to those of the former embodiment are designated by identical reference numerals. A cassette shell 57 consists of a variant shell half 57b and the above-mentioned shell half 42a each molded from plastics. On the outside of the first shell half 57b is formed a stepped portion 57c, so as to project into a portion of the passage mouth 44. The stepped portion 57c extends in a direction which is substantially parallel to a direction of advancement of the photographic film 3.

The cassette 55 is inserted in a camera 70. A cassette receiving chamber 71 defined in the camera 70 is provided with a positioning step 71b in correspondence with the stepped portion 57c. A photographic film receiving port 72 in the receiving chamber 71 is provided with a back wall 72a and a front wall 72b. As inserted in the receiving chamber 71, the cassette 55 is positioned by engagement between the positioning step 71b, and a back inside face 71a of the receiving chamber 71. There will be some play mainly in the direction of advancing the photographic film 3, but the cassette 55 will be reliably fixed rotationally.

Figure 15:
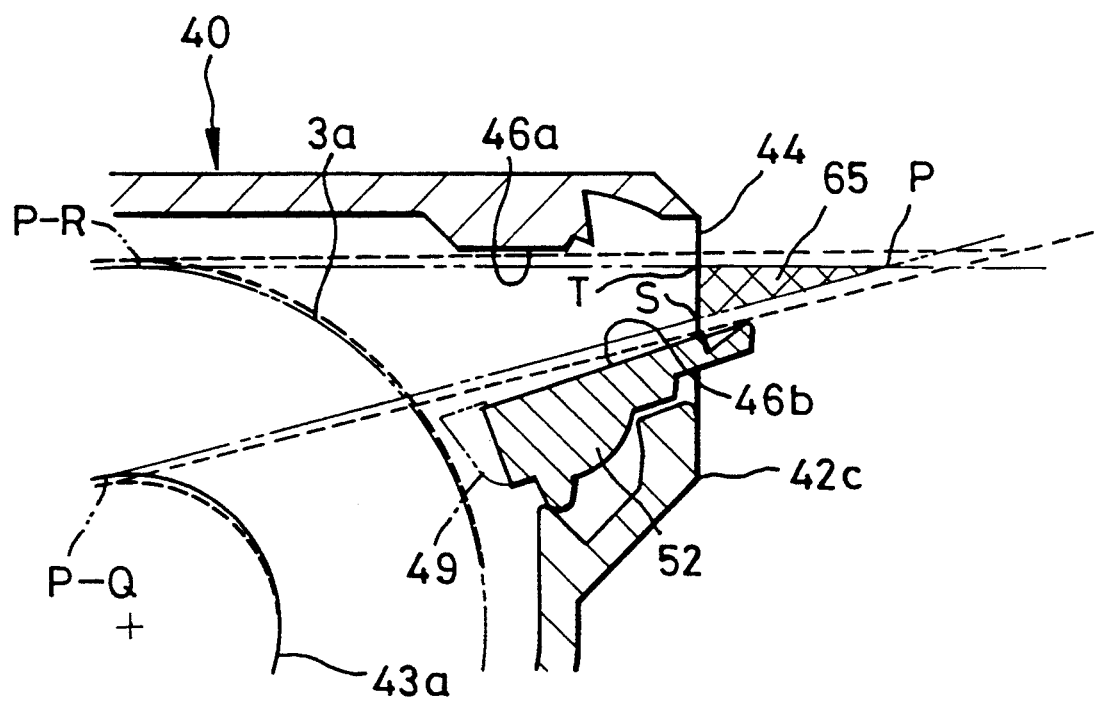
FIG. 15 is an explanatory view illustrating a range in which the photographic film of the cassette of FIGS. 10 to 12 is free from damage due to contact with the cassette shell.

A process of shaping the receiving ports 62, 72 of the embodiments above will be described below. As illustrated in FIG. 15, a straight line P–Q is commonly tangent to the spool core 43a and the first inside face 46b, and a straight line P-R is commonly tangent to the maximum circumference of the roll 3a and the second inside face 46a. Intersection point P lies outside the passage mouth 44. Lines P-Q and P-R and the passage mouth 44 define a triangular domain PST. Triangular domain PST represents a range within which it is possible that a leading end of the leader 3b assumes a position while the leader 3b is advanced by rotation of the spool 4 in the unwinding direction. The cassette 40, as inserted in the camera 60, has play as described above, so that triangular domain PST is variable in position relative to the inside of the receiving chamber 61. Therefore, an effective domain 65 can be conceived in which the leading end of the leader 3b is effectively passed during advancement, in consideration of the above-mentioned play of the cassette 40 within the camera 60. The effective domain 65 has a more restrictive range than domain PST, and is defined by an area where an infinite number of possible triangular domains, corresponding to the various possible positions of the cassette 40, are overlapped. The effective domain 65, as illustrated in FIG. 15, is related to the cassette 40 as loaded in the camera 60 under an idealized condition where the cassette 40 has even play in the various different directions, with reference to the receiving chamber 61. It can be considered that the leading end is passed through the domain 65 upon exiting the passage mouth 44, as viewed from the side of the camera 60. No matter what posture the cassette assumes in the camera, within the range of the play, the photographic film 3 is free from damage while it passes between line P-Q and line P-R, especially inside the domain 65 when unwinding or winding the photographic film 3, as the photographic film 3 is prevented from coming into contact with the relevant plastic parts.

As illustrated in FIG. 15, the effective line P-Q is shifted upward from the initial line as indicated by the broken line. The amount of shift of line P-Q is derived from consideration of both the play of the cassette 40 in the upward and/or left-ward direction and its rotational tolerance in the counterclockwise direction around the spool 43, as viewed in the same drawing. The effective line P-R is shifted downward from the initial line as indicated by the broken line. The amount of shift of line P-R is derived from consideration of both the downward play of the cassette 40 and its rotational tolerance in the counterclockwise direction around the spool 43, as viewed in the same drawing.

Figure 16:
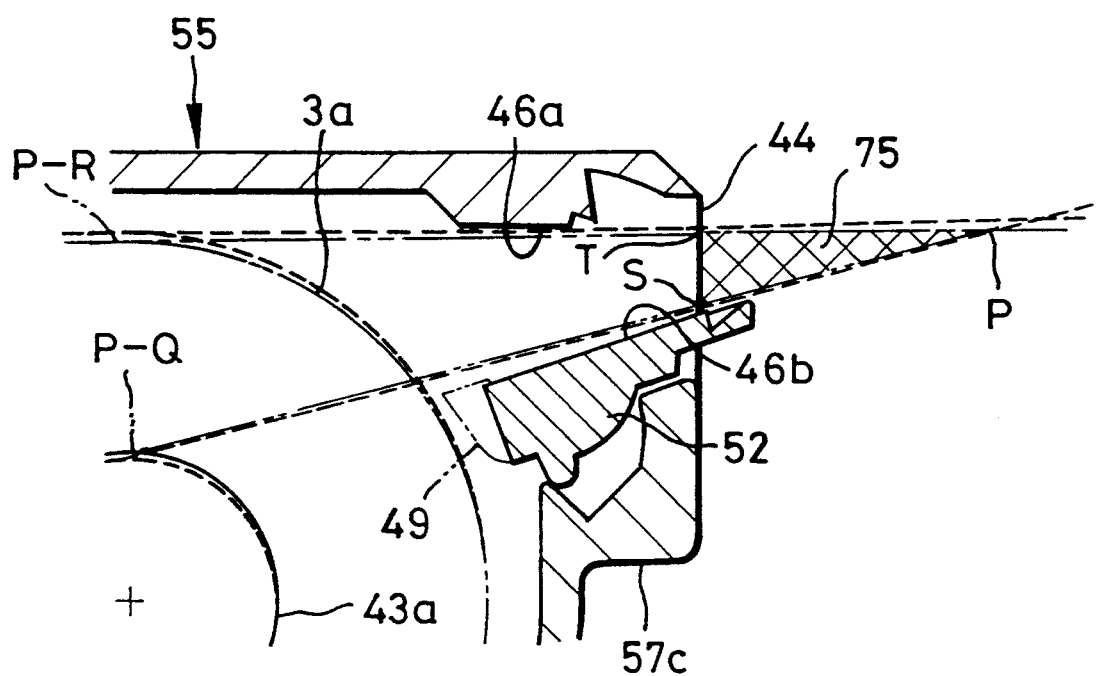
FIG. 16 is an explanatory view illustrating a damage-free range related to the cassette of FIG. 14.

For the cassette 55, an effective domain 75 for passage of the leading end is determined as illustrated in FIG. 16. The domain 75 is greater than the above-mentioned effective domain 65 because the cassette 55 has no rotational tolerance within the receiving chamber 56, unlike the former cassette 40. The effective line P-Q is shifted upward from the initial line as indicated by the broken line. The amount of shift of line P-Q is derived from consideration of the left-ward play of the cassette 55, as viewed in the same drawing. The effective line P-R is shifted downward from the initial line as indicated by the broken line. The amount of shift of line P-R is derived from consideration of a small backlash of the cassette 55 in the downward and/or left-ward direction.

The domain 65, 75 is favorably applicable to shape the desirable receiving port 62, 72 of the camera 60, 70. The receiving port 62, 72 is designed so as to define exactly the outline of the domain 65, 75, or as to have the front and back walls 62a, 62b, 72a, 72b slightly projected into the domain 65, 75, thereby to guide the photographic film 3 while protecting both surfaces 3c and 3d of the photographic film 3 from contact with the cassette shell 42, 57 during advancement.

The domain 65, 75 is defined, briefly, between the two crossed lines P-Q and P-R. Line P-Q is tangent to the spool core 43a, and does not intersect the second inside face 46a but low within the passageway 46. Line P-R is tangent to the maximum roll 3a, and does not intersect the first inside face 46b but is high within the passageway 46.

Figure 17:
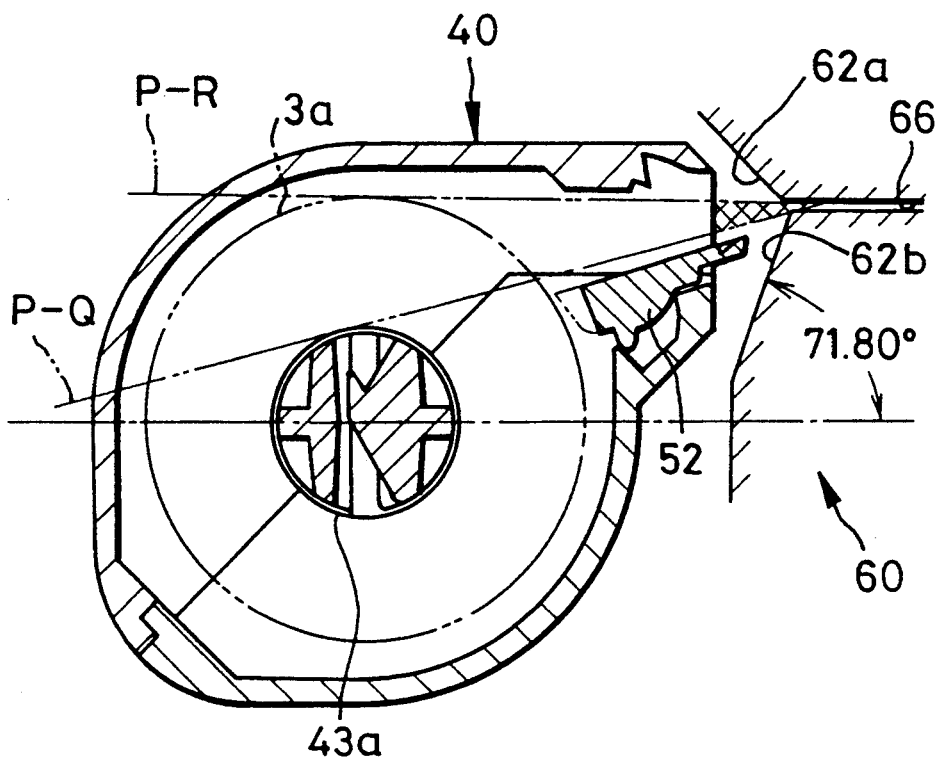
FIGS. 17 and 18 are explanatory views illustrating receiving ports of the cameras corresponding to the cassettes.
Figure 18:
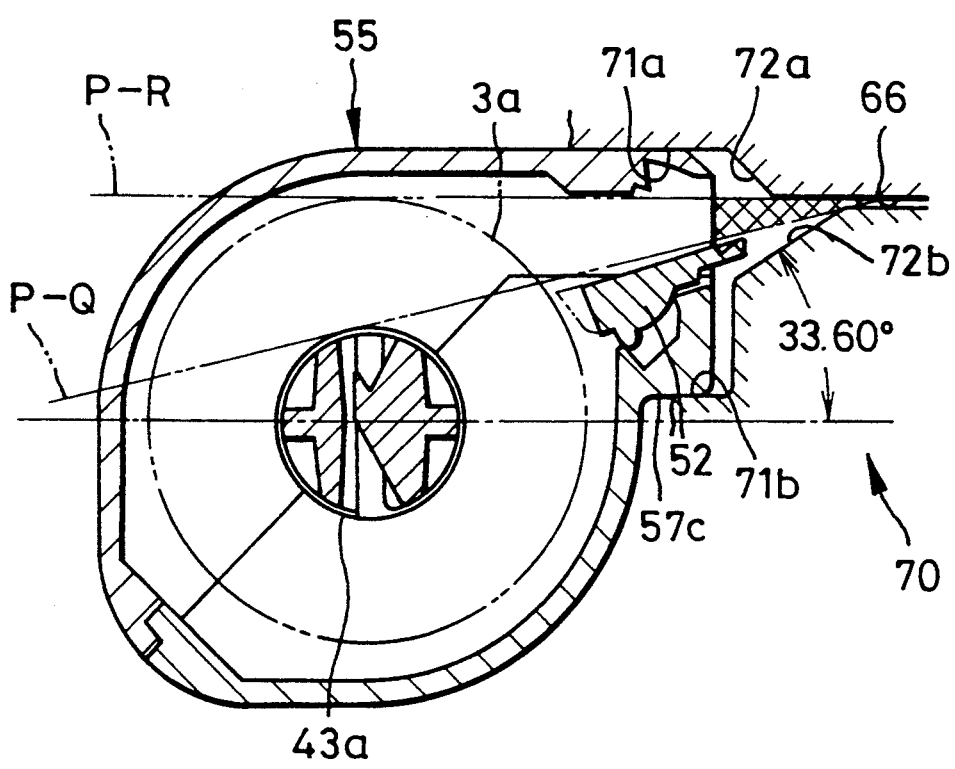
Figure 19:
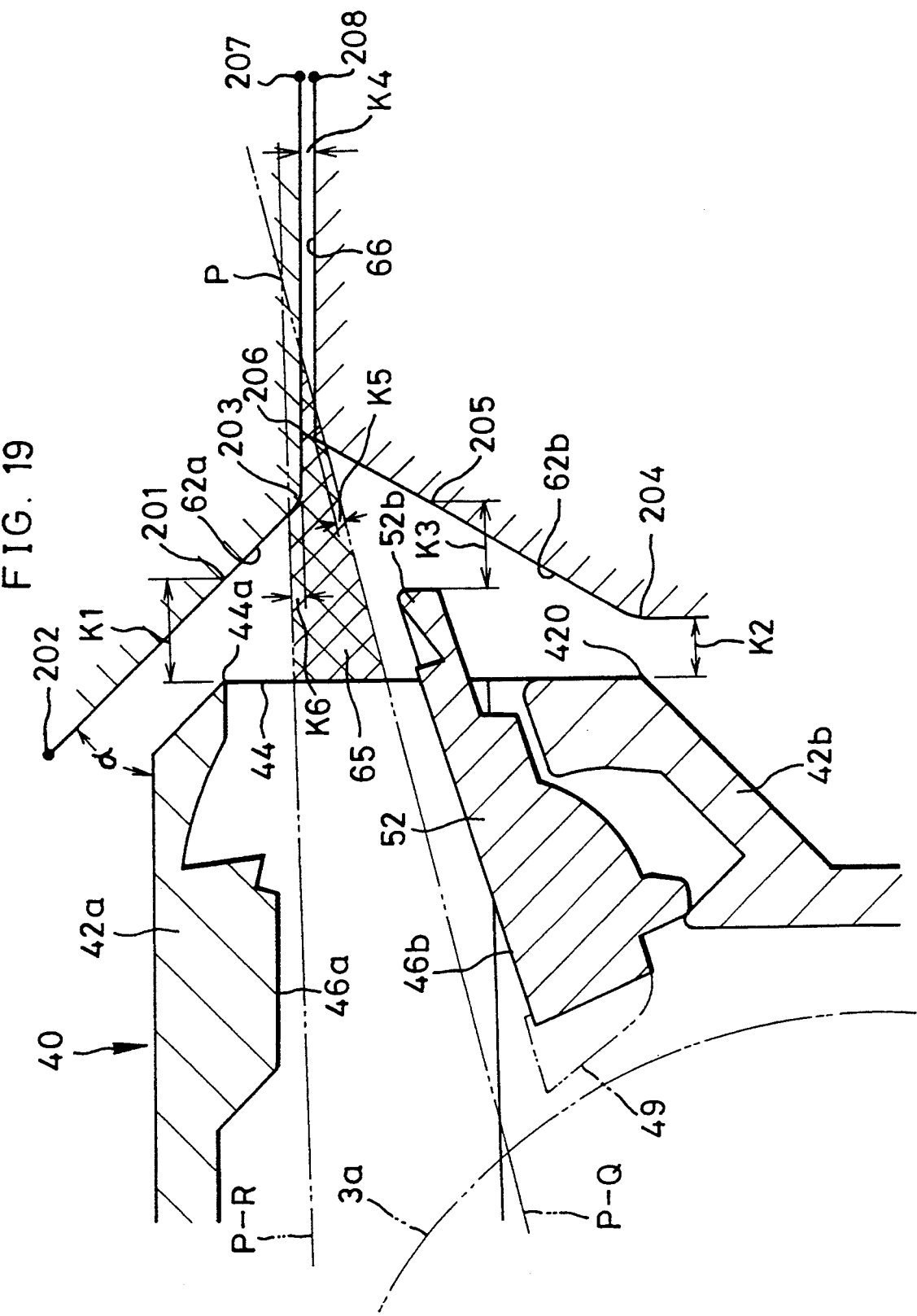
FIG. 19 is an explanatory view illustrating a manner of determining a suitable shape of the receiving port of FIG. 17.

The preferable receiving ports 62 and 72 are depicted in FIGS. 17 and 18, as derived from the domains 65 and 75. A step of deriving the receiving port 62 from the domain 65 is illustrated in FIG. 19. Let a point 201 be horizontally spaced at K1=1.5 mm from an upper edge 44a of the passage mouth 44 outward from the second inside face 46a. A line 201-202 is drawn from point 201 at an inclination of a equal to 45 degrees, and is extended into the domain 65. Inclined line 201-203 defines a surface of the back wall 62a for guiding the photographic film 3 from the back, in contact with the back surface 3d. In the underside of the passage mouth 44, let a point 204 be horizontally spaced at K2=0.83 mm from an edge 42c outside of the first shell half 42b. Let a point 205 be horizontally spaced at K3=0.93 mm from a lowest position of an outermost edge 52b of the shutter plate 52 while in the open position. A straight line is drawn to connect points 204 and 205, and is extended into the domain 65. Extended line 204-206 defines a surface of the front wall 62b for guiding photographic film 3 from the front, in contact with the emulsion surface 3c. Lines 201-203 and 204-206 are brought across two parallel lines 203-207 and 206-208 spaced at K4=0.22 mm. The two parallel lines define the inside of the passageway 66 within the camera 60. Arrangement of lines 203-207 and 206-208 is so determined that they cross inclined lines 201-203 and 204-206 in positions K5 and K6 distant from lines P-Q and P-R respectively, where K5 and K6 are both equal to 0.1 mm. Finally, the apices of points 203, 204 and 206 are rounded off at the radii of curvature 0.5 mm, 0.5 mm and 0.2 mm respectively, to shape the receiving port 62 of FIG. 17.

The walls 62a and 62b are projected into the domain 65 to a distance of 0.1 mm so that the photographic film 3 as advanced is protected from contact with the receiving port 62 regardless of any position the cassette 40 assumes within the anticipated range. The receiving port 72 of FIG. 18 is shaped in the similar process. The angle of the front wall 72b to the passageway 66 is different from that of the front wall 62b, because the effective lines P-Q and P-R are different between the cameras 60 and 70, which differ in play in loading the cassette 40, 55 therewith.

Note that the edge 52b of the shutter plate 52, as opened, projects 1.3 mm from the first shell half 42b, 57b, so as to prevent the leader 3b from entering a spacing between the cassette shell and the inside of the receiving chamber 61, 71, even when an interval is defined between the cassette shell 42, 57 and the receiving port 62, 72.

Figure 20:
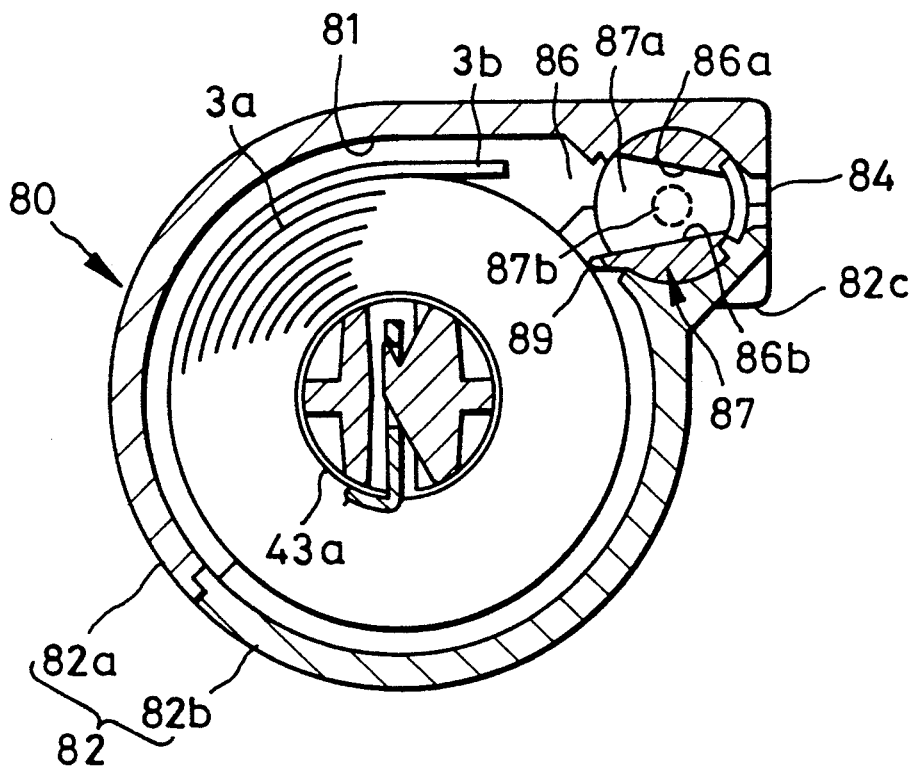
FIG. 20 is a cross section illustrating another preferred embodiment of the cassette in which a rotary shutter rod is used.
Figure 21:
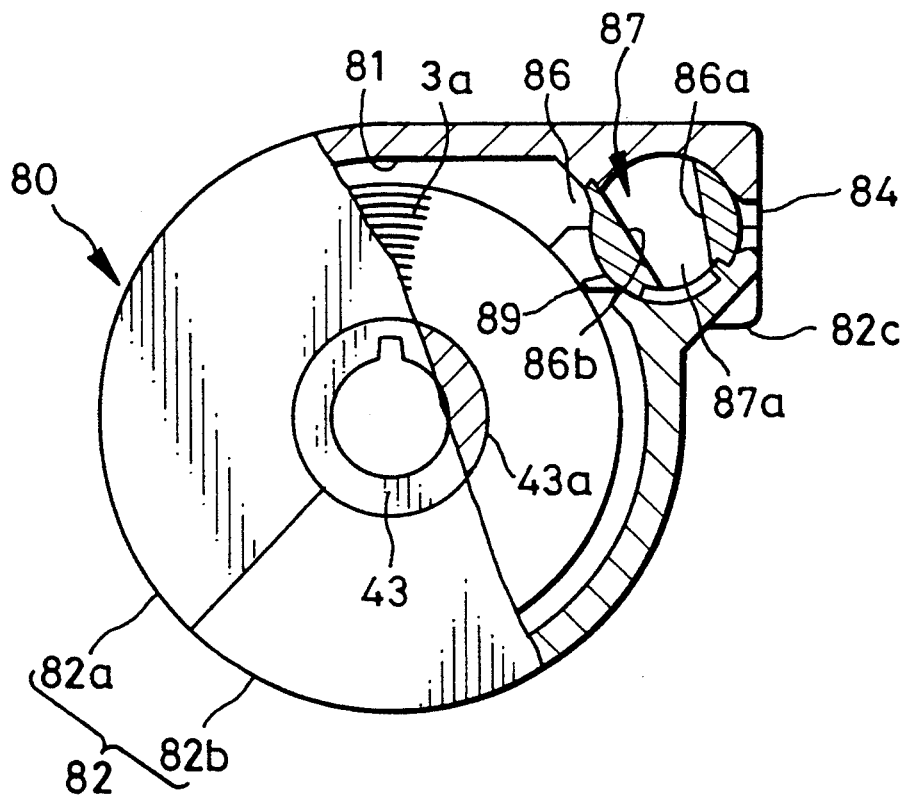
FIG. 21 is an end view, in partial section, illustrating the cassette of FIG. 20 in the state where the shutter rod is closed.

Reference is now made to FIGS. 20 and 21 illustrating a further preferred embodiment of the photographic film cassette 80, in which a shutter rod 87 is used. Elements the same as the former embodiments are designated with the identical reference numerals. The shutter rod 87 is supported rotatably between two shell halves 82a and 82b, in contact with arcuate contact faces formed in the shell halves 82a and 82b. An operable shaft portion 87b, like the above-mentioned shaft portion 52a, is formed on one end of the shutter rod 87, and extends through one end face of a cassette shell 82 on the side of the spool end 43b.

A slot 87a is formed in the shutter rod 87 so as to define a passage shutter rod 87. A pair of inside faces 86a and 86b of a passageway 86 are partly formed on the inside of the slot 87a. The shutter rod 87, when in the closed position, causes two walls of the slot 87a to partition the roll chamber 81 from the passage mouth 84. When in the open position, the slot 87a provides the communication between the passage mouth 84 and the roll chamber 81, so that the passageway 86 is open. A separator claw 89 is also provided. The ridges 5 may be provided inside the cassette 80, but are omitted from FIGS. 20 and 21, and are adapted to advancing the leader 3b of the photographic film 3 outward from a passage mouth 84 in response to rotation of the spool 43.

Figure 22:
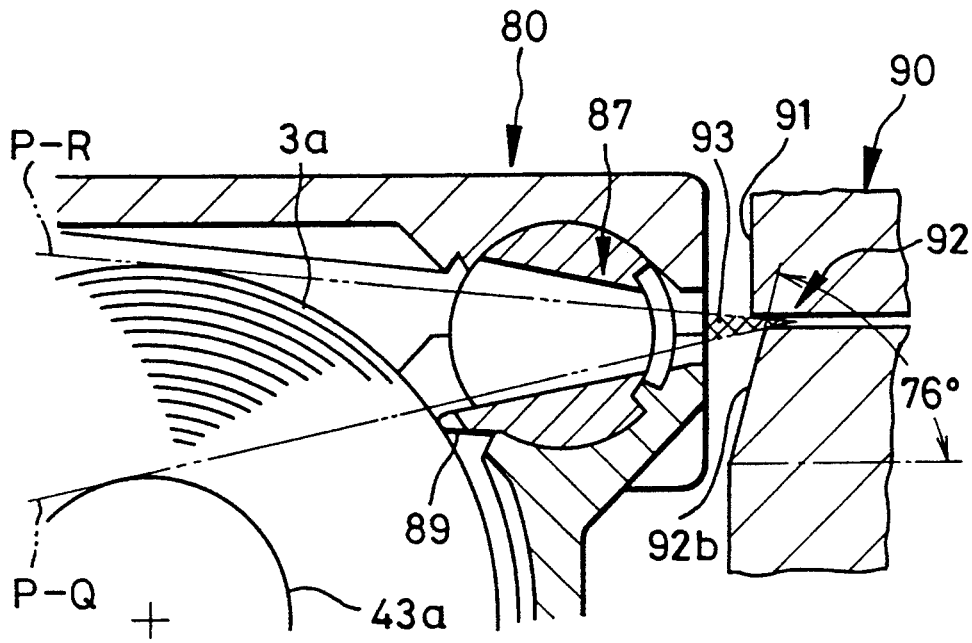
FIGS. 22 and 23 are explanatory views illustrating ranges in which the photographic film of the cassette of FIGS. 20 and 21 is free from damage.

The cassette 80 is adapted to loading into both cameras 90 and 95. As illustrated in FIG. 22, a cassette receiving chamber 91 of the camera 90 has a receiving port 92, and an inclined front wall 92b thereof. The cassette 80 is properly positioned within the receiving chamber 61 by the engagement of the drive shaft 63 with the spool 43 and of the opening shaft 64 with the operable shaft portion 87b.

Figure 23:
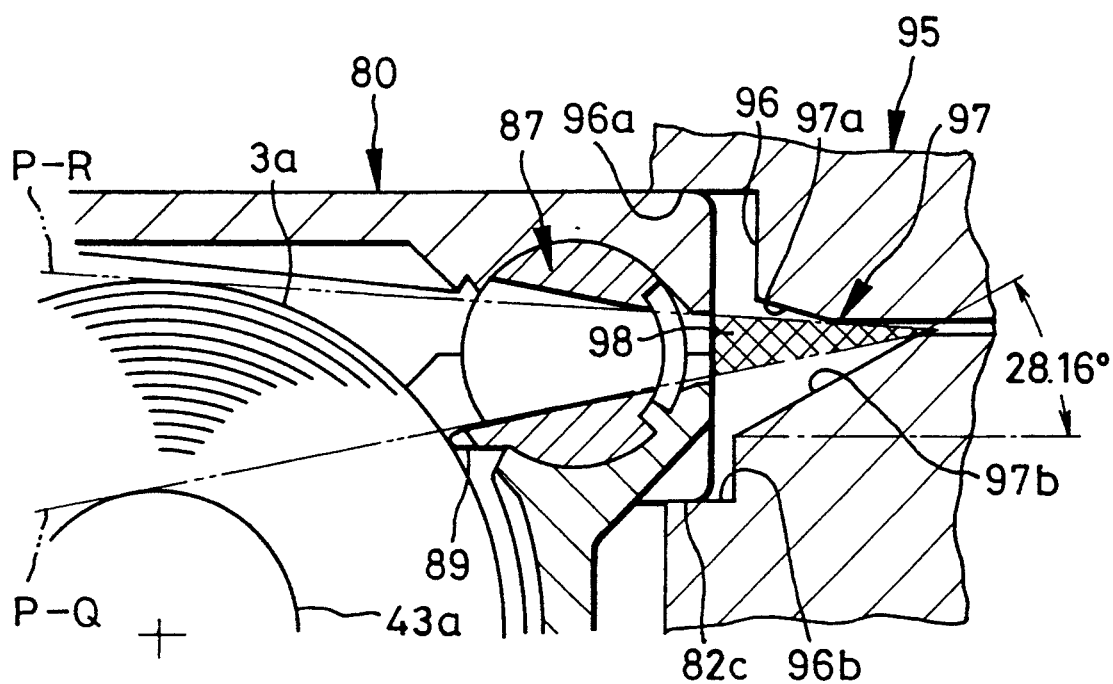

Referring to FIG. 23, a cassette receiving chamber 96 of the camera 95 has a receiving port 97 defined by back and front walls 96a and 96b thereof. As inserted, the cassette 80 is positioned by the front wall 96b of the receiving port 97, in cooperation with a stepped portion 82c formed on the cassette 80.

Figure 24:
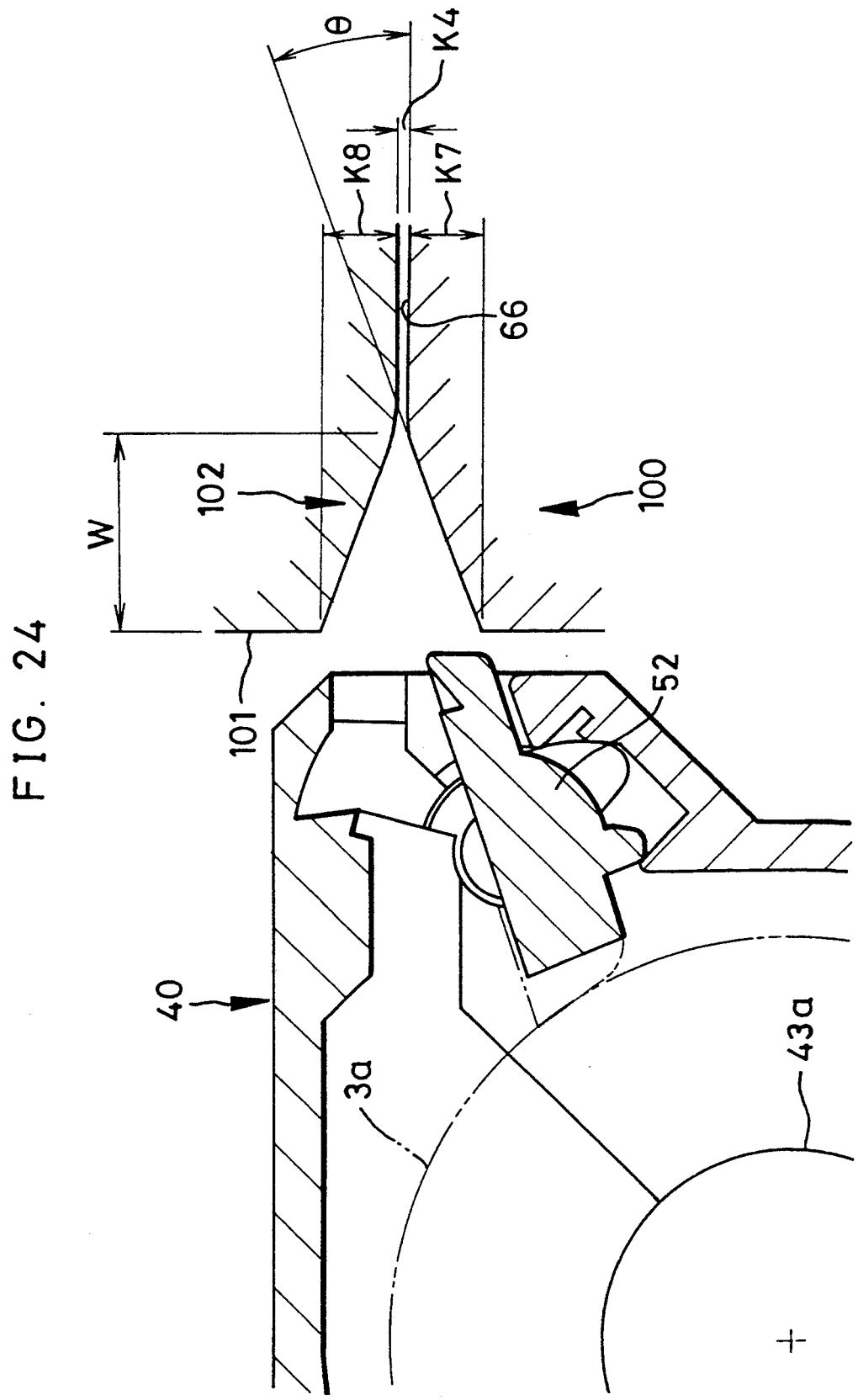
FIG. 24 is an explanatory view illustrating a sample for testing a performance of passing the leader through a receiving port of a novel camera.

FIG. 24 shows a camera 100 as used in experiments with the cassette 40 as described above. The passageway within the camera 100 is open to a cassette receiving chamber 101 via a receiving port 102. The passageway 66 has the width K4 equal to 0.22 mm. The receiving port 102 has a variable width. At its forwardmost position K7=1.35 mm and at its backmost position K8=1.35 mm. The depth W of the receiving port 102 is varied according to the angle 0 of inclination, under the equation:

$$K7 = K8 = W \cdot \tan \theta.$$

Experiments were conducted with camera 100 and cassette 40. The photographic film 3 was wound on a spool core having a diameter of 7 mm, and was let stand in an environment of 80 degrees Celsius for 2 hours. The spool core was rotated in the unwinding direction in order to advance the leader 3b to the outside of the novel cassette, as loaded in the camera 100, while the angle θ was changed. The results indicated that the receiving port 102 was passable to the leader as advanced, at an angle of any of 10, 20, 30 and 45 degrees. The port depth W as was changed is shown in the table below:

TABLE 1

| θ (degrees) | 10 | 20 | 30 | 45 |
|---|---|---|---|---|
| W (mm) | 7.66 | 3.71 | 2.34 | 1.35 |

It was also recognized from the above experiments that the photographic film 3 was so curled in the widthwise direction to be convex toward the back at 0.3 mm. It is possible to design the receiving port further taking into account to the widthwise curling of the photographic film 3.

Figure 25:
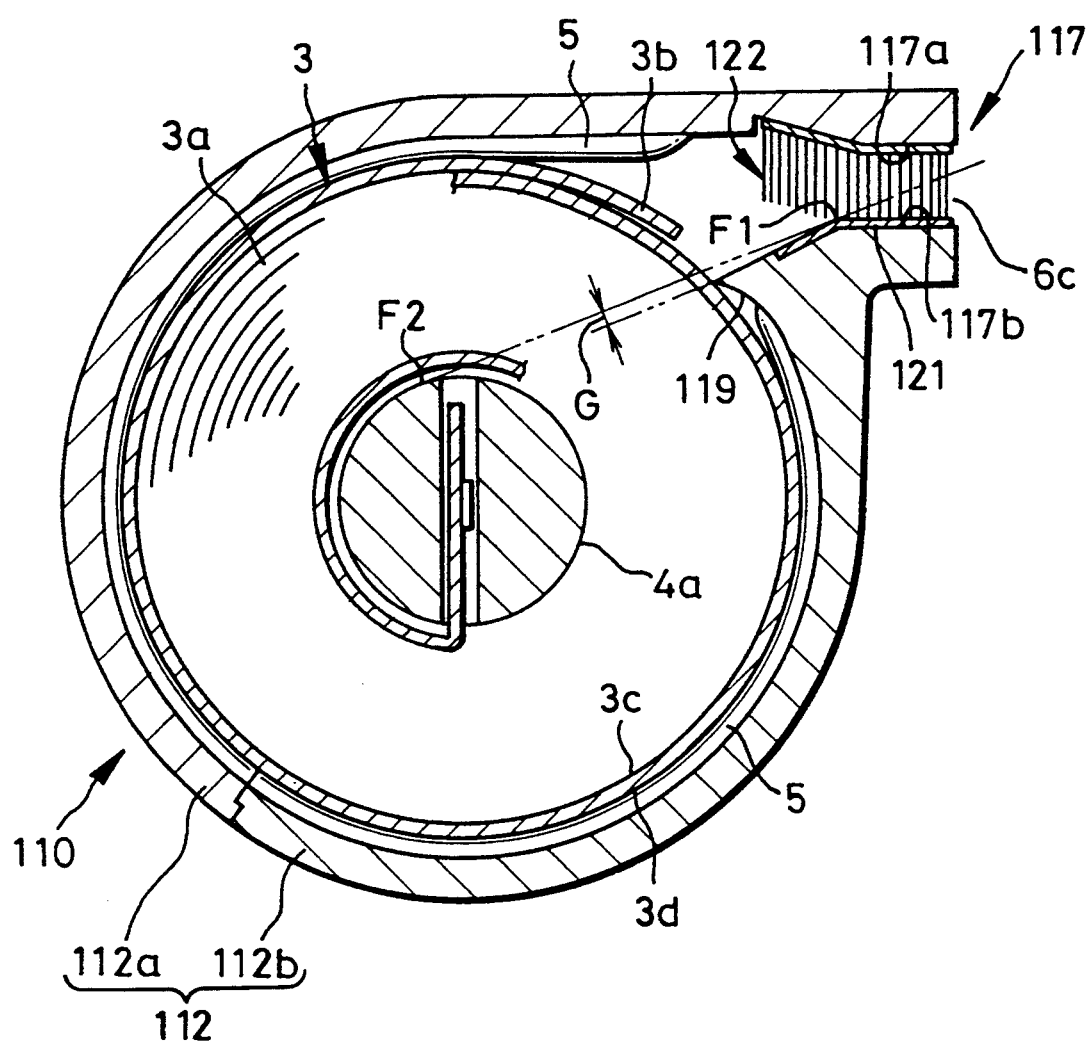
FIG. 25 is a cross section illustrating another preferred embodiment of the cassette in which the leader can be smoothly passed between light-trapping ribbons.

There is a problem in the light-trapping ribbons related to the embodiment of FIGS. 8 and 9, in that the leader as separated from the roll might be caught by them and fail to exit from the cassette, particularly in contact with the ribbon 30b corresponding to the emulsion surface 3c of the photographic film 3. FIG. 25 illustrates a novel cassette 110 for solving this problem. Elements the same as the former embodiments are designated by the identical reference numerals.

A cassette shell 112 consists of a pair of shell halves 112a and 112b. A thin ribbon 121 of fabric is attached to a first inside face 117b, and a resilient light-trapping ribbon 122 of pile fabric is attached to a second inside face 117a. An innermost edge of the thin ribbon 121 as viewed along the second inside face 117a is received in a step slightly recessed in correspondence with the thickness of the ribbon 121 so as to prevent the leader 3b from being caught by the innermost edge of the ribbon 121. The leader 3b of the photographic film 3, as separated by a separator claw 119, still has a tendency to curl, so that the emulsion surface 3c of the leader 3b comes into contact with the surface of the thin ribbon 121 while the leader 3b is advanced within a passageway 117 during rotation of the spool 4 in the unwinding direction. Resilience of the light-trapping ribbon 122 brings the photographic film 3 in tight contact with both ribbons 121 and 122 even while the photographic film 3 is passed between them, so as to prevent ambient light from entering a roll chamber of the cassette shell 112.

The first inside face 117b is (constructed so as to prevent the emulsion surface 3c from coming into contact with the separator claw 119 when the photographic film 3 is fully or almost fully drawn out of the cassette shell 12 to a minimum circumference of the roll 3a of the photographic film 3. To be precise, a straight line F1-F2 is drawn to be tangent commonly to the upper side of the thin ribbon 121 and the circumference of the spool core 4a, where F1 and F2 are points of contact of the thin ribbon 121 and the spool core 4a respectively. The separator claw 119 is formed to be spaced from line F1-F2 at a clearance G>0. The photographic film 3, therefore, never crosses line F1-F2 to the side of the separator claw 119, no matter how small the roll 3a of the photographic film 3 becomes, in advancing the photographic film 3 outward from the cassette shell 112. Thus the emulsion surface 3c does not come into contact with the separator claw 119, and is protected from damages.

The thin ribbon 121 is of fabric woven from 0.2 denier extra-fine polyester to be 0.22 mm thick, and dyed in black. Its upper surface is processed to erect the fluff of fiber. To attach the thin ribbon 121 to the first inside face 117b, double-sided adhesive tape is used, e.g. NP305B (trade name) manufactured by Sony Chemical Co., Ltd.

The light-trapping ribbon 122 consists in pile fabric. According to a 1st Example, the light-trapping ribbon 122 is of a pile woven fabric in which pile threads are woven on the base fabric. Warp threads of the base are of viscose rayon of 120 deniers and 25 filaments, and manufactured by Kuraray Co., Ltd. Weft threads of the base are of viscose rayon of 150 deniers and 30 filaments, and manufactured by Kuraray Co., Ltd. The pile threads are of nylon-66 of 100 deniers and 48 filaments, and manufactured by Toray Co., Ltd. The pile threads are woven into the base while intersecting in the V-shape. The fabric is woven generally in a manner of twill weave, at a fabric width of 5.0 mm, at the pile thread weaving width of 3.5 mm, at a warp thread weaving density of 40 threads/inch, at a weft thread weaving density of 40 threads/inch, and at a pile thread 2 weaving density of 38,000 threads/cm². The fabric, as woven, is processed in a shearing machine to cut the pile threads at the height of 2.0 mm, and is dyed black in a wince dyeing machine with a Mitsui Nylon Black SGL (trade name; manufactured by MITSUI TOATSU CHEMICALS, INC.) at 6% on the weight of fiber (o.w.f.). The back surface of the base is coated with a sealing material, and then adhesive agent. The light-trapping ribbon 122 thus finished is placed on the second inside face 117a, heated by a heat sealer, and attached to the second inside face 117a.

A 2nd Example of the light-trapping ribbon 122 is mated with the thin ribbon 121 as above, but is of a pile knitted fabric, unlike the 1st Example. Chain threads for the base fabric are of 709-polyester (trade name) of the double of 30 deniers and 18 filaments, and manufactured by Toyobo Co., Ltd. Inlaid threads of the base are of 709-polyester (trade name) of 30 deniers and 18 filaments, and manufactured by Toyobo Co., Ltd. Pile threads are of 647-polyester (trade name) of 50 deniers and 36 filaments, manufactured by Toyobo Co., Ltd., and of 7524551P-polyester (trade name) of 75 deniers and 24 filaments, manufactured by Kuraray Co., Ltd. The fabric is knitted in a double raschel machine, at a fabric width of 5.0 mm, at a pile knitting width of 3.5 mm, at a course knitting density of 30 threads/inch, at a wale knitting density of 10 threads/inch, 2 and at a pile thread knitting density of 40,000 threads/cm². The fabric, as woven, is processed in a shearing machine to cut the pile threads at the height of 2.0 mm, and is dyed black in a high pressure jet dyeing machine with Sandoz CS-2 (trade name; manufactured by SANDOZ PHARMACEUTICALS, LTD.) at 7% o.w.f., and subjected to remaining processing steps similar to the 1st Example.

A 3rd Example of the light-trapping ribbon 122 is mated with the thin ribbon 121, and is of a pile woven fabric. Warp threads of the base are of anti-static nylon of 50 deniers and 30 filaments, and manufactured by Toray Co., Ltd. Weft threads of the base are of anti-static nylon of 70 deniers and 24 filaments, and manufactured by Toray Co., Ltd. Pile threads are of Promilan T8100 nylon (trade name) of 100 deniers and 48 filaments, and manufactured by Toray Co., Ltd. The pile threads are woven into the base while intersecting in the V-shape. The fabric is woven generally in a manner of plain weave, at a fabric width of 5.0 mm, at the pile thread weaving width of 3.5 mm, at a warp thread weaving density of 50 threads/inch, at a weft thread weaving density of 24 threads/inch, and at a pile thread weaving density of 58,000 threads/cm². Remaining conditions are the same as the 1st Example.

Figure 26:
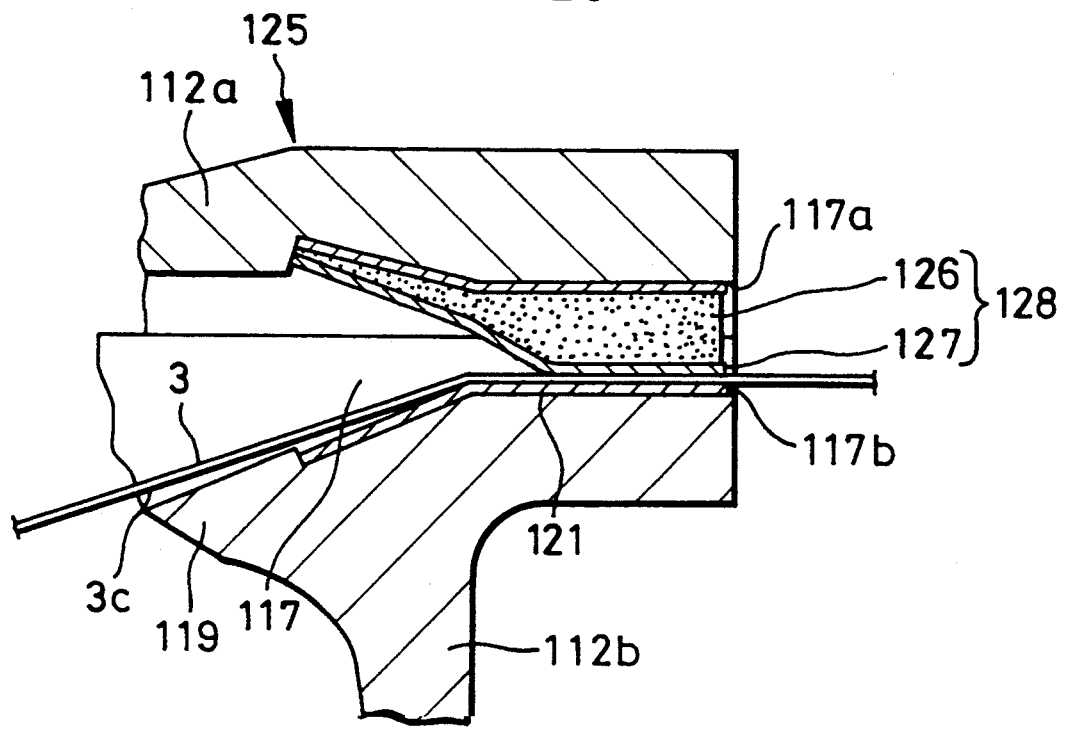
FIG. 26 is a cross sectional view illustrating a passageway of a cassette according to another preferred embodiment.

With reference to FIG. 26, a preferred photographic film cassette 125 according to a Variant Example is provided with the above thin ribbon 121 on the first inside face 117b, and a light-shielding member 128 attached to the second inside face 117a and constituted of a soft sponge 126 and a ribbon 127 of fabric. The soft sponge 126 is a high-density sponge of ester type polyurethane (60 kg/m³, 2.3 mm thick) manufactured by Bridgestone Corporation. The ribbon 127 is of fabric woven from 0.2 denier extra-fine polyester to be 0.22 mm thick. Its front surface is processed to erect the fluff of fiber. The ribbon 127 is attached to the sponge 126 as base layer, by flame-laminating, in which the surfaces of the sponge is melted by flame and the ribbon is pressed thereon. The resulting material then is cut and slit to be 30×6 mm so as to yield the light-shielding member 128. In order to prevent the leader 3b from being caught on and stopped by the innermost edge of the light-shielding member 128 during advancement, an ultrasonic welding horn for generating ultrasonic waves is utilized and applied to the innermost portion to melt and shrink it and thus make it thinner. Then the above-mentioned double-sided adhesive tape, i.e., Sony Chemical NP305B is used to attach the light-shielding member 128 to the second inside face 117a. The first inside face 117b is constructed a manner similar to that of the former Examples.

Figure 27:
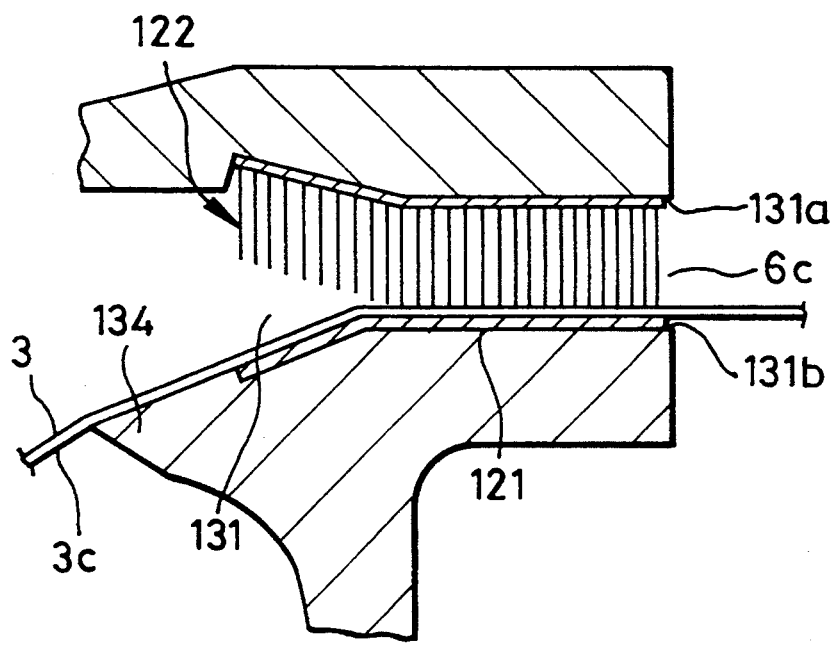
FIG. 27 is a cross sectional view illustrating a passageway of a cassette according to a comparative example used for an experiment.

To compare the effects of the novel cassettes according to the Examples above, the cassette as illustrated in FIG. 27 was used as a Comparative Example in the experiments that were conducted in relation to the present invention. A first inside face 131b of a passageway 131 is lower or flatter than the novel first inside face 117b, so that the emulsion surface 3c of photographic film 3 is in contact with a conventional separator claw 134. Two inside faces 131a and 131b are provided with the above thin ribbon 121 and light-trapping ribbon 122.

The results of the experiments are shown in the table below. The film dust created was evidenced by a decrease in weight of the photographic film 3 after an operation where the leader 3b had been advanced outward and rewound back inward 100 times under a film-stretching tension of 200 g in a direction opposite to the movement. Scratches on the film were inspected by making the photoprints from the photographic film 3 developed after the operation where the leader had been advanced outward and rewound back inward 100 times. The torque applied to the spool 4 during leader advancement was measured by a torquemeter. The success in advancing the leader herein is represented by a percentage, or ratio of the number of cassettes whose leader reliably exited out of the passage mouth upon spool rotation, to the total number, 50 herein, multiplied by 100.

TABLE 2

|  | 1st Ex. | 2nd Ex. | 3rd Ex. | Var. Ex. | Comp. Ex. |
|---|---|---|---|---|---|
| Member on First Inside Face | Woven Thin Ribbon | | | | |
| Member on Second Inside Face | Twill-weave Woven Ribbon | Knitted Ribbon | Plain-weave Woven Ribbon | Sponge & Woven Thin Ribbon | Plain-weave Woven Ribbon |
| Film Dust as Created | None, A | None A | None, A | None, A | Recognized 1 mg, D |
| Scratches on Photoprint | None, A | None, A | None, A | Non, A | Recognized D |
| Leader-Advancing Torque (in g · cm) | 100%, A | 100%, A | 100%, A | 100%, A | 100%, A |
| Success in Advancing Leader | 100%, A | 100%, A | 100%, A | 100%, A | 100%, A |
| General Evaluation | A | A | A | A | D |

A, B, C and D represent grades of evaluation, in which A is Excellent, B is Good, C is Fair or almost unusable, D is Failure or unusable. It is apparent that the 1st to 3rd and Variant Examples according to the present invention are excellent in performance.

As resin for constructing the novel cassette, in view of intensity and rigidity, high-impact polystyrene (HIPS), styrene/butadiene block copolymer resin (SB), acrylonitrile-butadiene-styrene resin (ABS), polycarbonate resin (PC), polypropylene resin (PP), polybutylene terephthalate (PBT), polyethylene terephthalate (PET), polyamide (PA), among others can be used.

For the pair of shell halves, HIPS, SB, and PC are preferably used from among the above-mentioned resins. Particularly, styrene type resin is preferable, such as HIPS and SB (e.g. ASAFLEX (trade name) manufactured by Asahi Chemical Industry Co., Ltd., CLEARENE (trade name) manufactured by Denka Co., and K-RESIN (trade name) manufactured by Phillips Oil Co.). A mixture of SB and general-purpose polystyrene (GPPS) and a mixture of SB and HIPS is still more preferable. To impart the light-shielding characteristic to the shell halves, carbon black is added to the resin at 0.05-3.0 wt %. To improve the moldability and resistance to wear and abrasion in friction between resinous parts or between the resin and the photographic film, silicone oil is added to the resin at 0.5-3 wt %. It is preferable to add carbon black at 0.3-1.5 wt %, and silicone oil at 1.0-2.5 wt %.

For the shutter plate or shutter rod, HIPS, SB, high density polyethylene resin (HDPE) and PA can be used. HDPE and PA are advantageous in high resistance to wear and abrasion in friction against the photographic film. There could be deformation of crystalline resin in use, such as HDPE and PA, which causes the cassette to exhibit unsatisfactory light-shielding performance. To avoid unsatisfactory light-shielding, the molds for molding the shutter members may be prepared while taking possible deformation of resin into account, or the shutter members may be preformed. SB in use may be mixed with GPPS, HIPS, or other resin compatible with SB. It is preferable to use mixture of SB with at least 30% of GPPS, or mixture of SB with at least 30% of HIPS. It is preferable to add carbon black and silicone oil, at amounts in the ranges similar to those for the shell halves, to the resin for the shutter member.

In consideration of disposal of waste after using the cassette, it is preferable to use the same resin of styrene type for each part of the cassette, (i.e., shell halves, spool core, spool flanges and shutter member). Use of the same resin is favorable in remolding and regenerating the resin by crashing and pelletizing empty cassettes collectively after removal of the exposed photographic film. This is favorable for economic and environmental reasons.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, as defined by the appended claims, they should be construed as included therein.

What is claimed is:

1. A photographic film apparatus comprising a photographic film cassette including a cassette shell having a roll chamber defined therein, a spool rotatably contained in said roll chamber, photographic film wound in a roll on a core of said spool between a pair of flanges formed on said spool, said photographic film having an emulsion surface and a back surface, rotation of said spool in an unwinding direction causing a leader of said photographic film to advance outward through a passage mouth defined in said cassette shell, said photographic film cassette comprising:

a passageway formed in said cassette shell between said roll chamber and said passage mouth for allowing said photographic film to pass therethrough, a channel of said passageway being defined by opposed first and second inside faces of said cassette shell which are spaced apart from each other, said first inside face being in opposition to said emulsion surface of said photographic film, and said second inside face being in opposition to said back surface of said photographic film when said film is in said passageway;

a separator claw formed on said first inside face on a side thereof corresponding to said roll chamber so as to come into contact with said leader when said spool is rotated in an unwinding direction and separate said leader from said roll wound around said spool; and said first inside face and said separator claw being disposed entirely on one side of a first tangent line which passes through a point located on an edge of said second inside face, on a side thereof which is most remote from said spool, and a tangent point of said spool core.

2. A photographic film apparatus as defined in claim 1, wherein said cassette shell is constituted of a first shell half provided with said first inside face and said separator claw, and a second shell half provided with said second inside face, said cassette further comprising:

a light-shielding structure associated with said passageway for preventing ambient light from entering said roll chamber through said passageway.

3. A photographic film apparatus as defined in claim 2, wherein said light-shielding structure is a shutter movably mounted in said cassette shell so as to be movable between a closed position and an open position, said shutter blocking said passageway to prevent ambient light from entering said roll chamber when said shutter is disposed in said closed position, and said shutter not blocking said passageway so as to allow said photographic film to pass therethrough when said shutter is disposed in said open position.

4. A photographic film apparatus as defined in claim 3, wherein said shutter is provided with a pair of externally operable portions which extend to an exterior of said cassette shell, when said cassette shell is loaded in a camera, said shutter is operated by said camera via engagement between said camera and said operable portions and is displaced from said closed position to said open position, and, in response to completion of rewinding of said photographic film into said cassette shell, said shutter is displaced from said open position to said closed position by said camera.

5. A photographic film apparatus as defined in claim 4, wherein, said shutter is fitted in a slot formed in said first shell half when said shutter is in said open position.

6. A photographic film apparatus as defined in claim 5, further comprising:

a pair of access holes formed in an outside of said second shell half, said camera being provided with a pair of opening operating members which are inserted in said access holes when said cassette shell is loaded in said camera so as to engage with said operable portions, and move said shutter to said open position; and a pair of access openings formed in an outside of said first shell half so as to communicate with said slot, said camera being provided with a pair of closing operating members which are inserted in said access openings so as to engage with said operable portions and move said shutter to said closed position in response to completion of rewinding of said photographic film into said cassette shell inside said camera.

7. A photographic film apparatus as defined in claim 6, wherein said shutter is provided leg portions on both lateral ends so as to be in a shape of a channel, a pair of grooves being formed in said first shell half for receiving said leg portions.

8. A photographic film apparatus as defined in claim 2, wherein said light-shielding structure includes first and second light-trapping ribbons respectively attached to said first and second inside faces, said first inside face and said separator claw are disposed entirely on one side of a second tangent line which passes through a point on an end portion of said first light-trapping ribbon which is closest to said spool and is tangent to said spool core.

9. A photographic film apparatus as defined in claim 8, wherein said first and second light-trapping ribbons each comprise a base fabric and pile threads disposed thereon, said point is on said base fabric of said first light-trapping ribbon.

10. A photographic film apparatus as defined in claim 9, wherein said base fabric of said second light-trapping ribbon is disposed entirely on one side of said second tangent line.

11. A photographic film apparatus as defined in claim 2, wherein said first and second inside faces and said separator claw are formed so as to define a third tangent line which passes through a first point which is located outside of said passage mouth of said cassette shell, does not intersect said first inside face and said separator claw, and is tangent to said spool core, and so as to define a fourth tangent line which passes through said first point, does not intersect said second inside face, and is tangent to said roll when said film is entirely wound on said spool.

12. A photographic film apparatus as defined in claim 11, wherein a position of said first point is within one domain, when said first point moves within said domain, said third and fourth tangent lines are moved and a camera for use with said cassette shell has a receiving port defined therein for receiving said photographic film after said film has advanced out of said passage mouth, said receiving port being defined within ranges formed by said third and fourth tangent lines.

13. A photographic film apparatus as defined in claim 12, wherein said ranges correspond to play created between said cassette shell and an inside of said camera when said camera contains said cassette shell.

14. A photographic film apparatus as defined in claim 12, wherein said light-shielding structure is a shutter arranged in said passageway, said shutter being movable between a closed position and an open position, said shutter blocking said passageway to prevent ambient light from entering said roll chamber when in said closed position, said shutter allowing said photographic film to pass through said passageway when in said open position.

15. A photographic film apparatus as defined in claim 14, further comprising shaft portions formed on both ends of said shutter, and rotatably fitted on said cassette shell, at least one of said shaft portions having a distal end which extends to an exterior of said cassette shell.

16. A photographic film apparatus as defined in claim 15, wherein an outer surface of said first shell half is provided with a stepped portion which defines said passage mouth, said stepped portion extending in a direction which is substantially parallel to a direction of advancement of said photographic film, and adapted to being positioned against a surface of said camera.

17. A photographic film apparatus as defined in claim 15, wherein said shutter is a plate which defines a portion of said first inside face, a planar surface of said plate being in opposition to said second inside face when said shutter is in said open position, said planar surface extending toward said second inside face when said shutter is in said closed position.

18. A photographic film apparatus as defined in claim 15, wherein said shutter is a rod supported rotatably between said first and second shell halves and having a slot formed therethrough, said slot being defined by a pair of walls which constitute a portion of said first and second inside faces respectively, said rod causing said two walls to block said passageway when in said closed position, and causing said slot to be aligned with said passageway when in said open position.

19. A photographic film apparatus as defined in claim 2, wherein said light-shielding structure includes a first light-trapping member attached to said first inside face and a second resilient light-trapping member attached to said second inside face and said separator claw is entirely disposed on one side of a fifth tangent line which is commonly tangent to a surface of said first light-trapping member and to said spool core.

20. A photographic film apparatus as defined in claim 19, wherein said first light-trapping member is a light-trapping ribbon of fabric and said second light-trapping member is a light-trapping ribbon including a base fabric and pile threads disposed thereon.

21. A photographic film apparatus as defined in claim 19, wherein said first light-trapping member is a light-trapping ribbon of fabric and said second light-trapping member includes a flexible base material and fabric layered thereon.

22. A photographic apparatus comprising a camera and a photographic film cassette, said cassette including a cassette shell, a spool rotatably contained in a roll chamber defined in said cassette, photographic film wound in a roll on a core of said spool between a pair of flanges formed on said spool, a passageway defined in said cassette shell so as to extend between said roll chamber and an exterior of said cassette shell, said passageway defined by opposed first and second inside faces which are spaced apart, said first inside face being in opposition to an emulsion surface of said photographic film, and said second inside face being in opposition to a back surface of said photographic film when said film is in said passageway, rotation of said spool in an unwinding direction causing a leader of said photographic film to advance outward through a passage mouth defined by said passageway, said camera comprising:

a cassette receiving chamber for receiving said photographic film cassette;

front and back walls which define a receiving port which is in communication with said cassette receiving chamber for receiving said photographic film when said film is advanced from said passage mouth while said photographic film cassette is loaded in said camera; and said front wall of said receiving port being formed so that a straight line commonly tangent to said front wall and said spool core of said photographic film cassette inside said cassette receiving chamber does not intersect with said first inside face of said photographic film cassette.

23. An apparatus as defined in claim 22, wherein said front wall of said receiving port is inclined toward a front of said camera so as to increase a width of said receiving port in a direction towards said receiving chamber.

24. An apparatus as defined in claim 22, further comprising:

a rotatable roller disposed on said front wall of said receiving port so as to be in contact with said photographic film.

25. An apparatus as defined in claim 24, wherein said photographic film cassette further includes a movable light-shielding structure arranged in said passageway for preventing ambient light from entering said roll chamber, said shielding structure having at least one operable portion which extends to an exterior of said cassette shell, further comprising opening operating means disposed in said receiving chamber for displacing said light-shielding structure from a closed position to an open position in response to loading of said photographic film cassette, said passageway being blocked when said light-shielding member is in said closed position to prevent ambient light from entering said roll chamber, and being open when in said open position to allow said photographic film to pass therethrough; and closing operating means for operating said operable portion in order to displace said light-shielding structure from said open position to said closed position in response to completion of rewinding of said photographic film into said cassette shell.

26. An apparatus as defined in claim 25, wherein a slot is formed in said inside face, said light-shielding structure of said photographic film cassette comprising:

a shutter slidably fitted in said slot, said shutter projecting from said slot over said first inside face in order to close said passageway when said light-shielding structure is in said closed position, and being contained in said slot to retreat from said first inside face when said light-shielding structure is in said open position.

27. An apparatus as defined in claim 26, wherein said shielding structure includes two operable portions, said photographic film cassette further includes a pair of access holes formed in said cassette shell in communication with both ends of said slot respectively to allow external access to said operable portion and a pair of access openings formed in said cassette shell in communication with both ends of said slot to allow external access to said operable portion in a direction opposite to said access holes;

said opening operating means includes two opening operating members to be inserted respectively into said access holes of said photographic film cassette inside said cassette receiving chamber, said opening operating members depressing said operable portions so as to slide said shutter to said open position in response to loading of said cassette shell; and said closing operating means includes two closing operating members to be inserted respectively into said access openings of said photographic film cassette inside said cassette receiving chamber, said closing operating members depressing said operable portions so as to slide said shutter to said closed position in response to completion of rewinding of said photographic film into said cassette shell.

28. An apparatus comprising a camera for use with a photographic film cassette, said cassette including:

a cassette shell;

a spool rotatably contained in a roll chamber defined in said cassette shell;

photographic film wound in a roll on a core of said spool between a pair of flanges formed on said spool;

a passageway defined in said cassette shell between said roll chamber and an exterior for allowing said photographic film to pass therethrough, a channel of said passageway being defined by opposed first and second inside faces which are spaced apart from each other, said first inside face being in opposition to an emulsion surface of said photographic film, and said second inside face being in opposition to a back surface of said photographic film when said film is in said passageway;

a separator claw formed on said first inside face on a side of said roll chamber so as to come into contact with said leader when said spool is rotated and separate from said leader from said roll, rotation of said spool in an unwinding direction causing a leader of said photographic film to advance outward through a passage mouth of said cassette shell; and said first and second inside faces and said separator claw being so formed so as to define a first tangent line which passes through a first point which is outside said passage mouth of said cassette shell, does not intersect said first inside face and said separator claw, and is tangent to said spool core, a second tangent line being defined which passes through said first point, does not intersect said second inside face, and is tangent to said roll when said film is entirely wound on said spool;

said camera having a cassette receiving chamber defined therein for receiving said photographic film cassette and a receiving port defined therein in communication with said cassette receiving chamber for receiving said photographic film when said film is advanced from said passage mouth while said photographic film cassette is loaded in said camera, said receiving port being defined by front and back walls which project into a domain defined between said first and second tangents respectively.

29. An apparatus as defined in claim 28, wherein said domain corresponds to play created between said photographic film cassette and an inside of said cassette receiving chamber when said camera contains said photographic film cassette.

30. A camera as defined in claim 28, further comprising:

a drive shaft disposed in said camera so as to project into said cassette receiving chamber to be engaged with one end of said spool for rotating said spool and said front and back walls of said receiving port being inclined respectively toward a front and a back of said camera so as to increase a width of said receiving port towards said receiving chamber.

31. An apparatus as defined in claim 30, wherein said photographic film cassette further includes:

a shutter movably disposed in said passageway so as to be movable between a closed position and an open position, said shutter blocking said passageway so as to prevent ambient light from entering said roll chamber when in said closed position, said passageway being opened so as to allow said photographic film to pass through said passageway when said shutter is in said open position; and shaft positions formed on both ends of said shutter, said shaft portions being rotatably fitted in said cassette shell, at least one of said shaft portions having a distal end which extends to an exterior of said cassette shell; and said cassette receiving chamber being provided with a rotary operating member which is engaged with said at least one of said shaft portions when said cassette is loaded in said camera in order to operate said one shaft portion so as to displace said shutter between said closed and open positions, said operating member being coupled to said camera so as to rotate said at least one of said shaft portions toward said open position in response to loading of said photographic film cassette, and so as to rotate said operable shaft portion toward said closed position in response to completion of rewinding of said photographic film into said cassette shell.

32. An apparatus as defined in claim 31, wherein said drive shaft and said rotary operating member properly position said photographic film cassette within said cassette receiving chamber by virtue of engagement of said drive shaft with said spool and of said operating member with said at least one shaft portions.

33. An apparatus as defined in claim 30, wherein a surface of said cassette shell of said photographic film cassette, on a side thereof which is proximate said receiving port, has a stepped portion formed thereon so as to define a projected portion of said passage mouth, said stepped portion extending substantially parallel to a direction of advancement of said photographic film, and said cassette receiving chamber has a positioning step formed thereon in correspondence with said stepped portion for receiving said stepped portion, to said photographic film cassette being positioned within said cassette receiving chamber by virtue of engagement of said stepped portion between said positioning step and a back inside face of said cassette receiving chamber.

34. A photographic film cassette including a cassette shell having a roll chamber defined therein, a spool rotatably contained in said roll chamber, photographic film wound in a roll on a core of said spool between a pair of flanges formed on said spool, said photographic film having an emulsion surface and a back surface, rotation of said spool in an unwinding direction causing a leader of said photographic film to advance outward through a passage mouth defined in said cassette shell, said photographic film cassette comprising:

a passageway formed in said cassette shell between said roll chamber and said passage mouth for allowing said photographic film to pass therethrough, a channel of said passageway being defined by opposed first and second inside faces which are spaced apart from each other, said first inside face being in opposition to said emulsion surface of said photographic film, and said second inside face being in opposition to said back surface of said photographic film when said film is in said passageway;

first and second light-trapping ribbons respectively attached to said first and second inside faces for preventing ambient light from entering said roll chamber;

a separator claw formed on said first inside face on a side thereof which is proximate said roll chamber so as to come into contact with said leader when said spool is rotated in said unwinding direction and separate said leader from said roll; and said first inside face and said separator claw being entirely disposed on one side of a tangent which passes through a point on said first light-trapping ribbon which is closest to said separator claw, said tangent line being tangent to said spool core.

35. A photographic film cassette including a cassette shell having a roll chamber defined therein, a spool rotatably contained in said roll chamber, photographic film wound in a roll on a core of said spool between a pair of flanges formed on said spool, said photographic film having an emulsion surface and a back surface, rotation of said spool in an unwinding direction causing a leader of said photographic film to advance outward through a passage mouth formed in said cassette shell, said photographic film cassette comprising:

a passageway formed in said cassette shell between said roll chamber and said passage mouth for allowing said film to pass therethrough, a channel of said passageway being defined by opposed first and second inside faces which are spaced apart from each other, said first inside face being in opposition to said emulsion surface of said photographic film, and said second inside face being in opposition to said back surface of said photographic film when said film is in said passageway;

a separator claw formed on said first inside face on a side thereof which is proximate said roll chamber so as to come into contact with said leader and separate said leader from said roll wound around said spool when said spool is rotated in said unwinding direction; and said first and second inside faces and said separator claw are formed so as to define a first tangent line which passes through a first point outside said passage mouth of said cassette shell, does not intersect said first inside face and said separator claw, and is tangent to said spool core, and so as to define a second tangent line which passes through said first point, does not intersect said second inside face, and is tangent to said roll when said film is entirely wound on said spool.

36. A photographic film cassette including a cassette shell having a roll chamber defined therein, a spool rotatably contained in said roll chamber, photographic film wound in a roll on a core of said spool between a pair of flanges formed on said spool, said photographic film having an emulsion surface and a back surface, rotation of said spool in an unwinding direction causing a leader of said photographic film to advance outward through a passage mouth defined in said cassette shell, said photographic film cassette comprising:

a passageway formed in said cassette shell between said roll chamber and said passage mouth for allowing said photographic film to pass therethrough, a channel of said passageway being defined by opposed first and second inside faces which are spaced apart from each other, said first inside face being in opposition to said emulsion surface of said photographic film, and said second inside face being in opposition to said back surface of said photographic film when said film is in said passageway;

a first light-trapping member attached to said first inside face;

a second resilient light-trapping member attached to said second inside face so as to prevent ambient light from entering said roll chamber by virtue of cooperation with said first light-trapping member; and a separator claw formed on said first inside face, on a side thereof which is proximate said roll chamber, so as to come into contact with said leader when said spool is rotated in said unwinding direction and separate said leader from said roll wound around said spool, said separator claw being entirely disposed on one side of a tangent line which is commonly tangent to said first inside face and said spool core.

* * * * *